(12) United States Patent
Yamamoto et al.

(10) Patent No.: US 6,567,453 B1
(45) Date of Patent: May 20, 2003

(54) SOLID-STATE LASER OSCILLATOR

(75) Inventors: Shuhei Yamamoto, Tokyo (JP);
Yasuharu Koyata, Tokyo (JP);
Yoshihito Hirano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 76 days.

(21) Appl. No.: 09/598,850

(22) Filed: Jun. 21, 2000

(30) Foreign Application Priority Data

Dec. 3, 1999 (JP) .......................................... 11-344802

(51) Int. Cl.$^7$ ................................................ H01S 3/14
(52) U.S. Cl. .......................................... 372/68; 372/68
(58) Field of Search .............................. 372/68, 33, 107

(56) References Cited

U.S. PATENT DOCUMENTS

| | | | | |
|---|---|---|---|---|
| 3,736,526 A | * | 5/1973 | Simmons | 372/18 |
| 4,554,666 A | * | 11/1985 | Altman | 372/19 |
| 4,942,586 A | * | 7/1990 | Lai | 372/68 |
| 5,001,718 A | * | 3/1991 | Burrows | 372/33 |
| 5,093,838 A | * | 3/1992 | Kubota | 372/107 |
| 5,272,713 A | * | 12/1993 | Sobey | 372/69 |
| 5,838,709 A | * | 11/1998 | Owa | 372/68 |
| 5,929,442 A | * | 7/1999 | Higashi | 250/339.13 |

OTHER PUBLICATIONS

Y. Hirano, et al, "208–W TEM$_{00}$ Operation of a Diode–Pumped Nd: YAG Rod Laser," May 15, 1999, vol. 24, No. 10, pp. 679–681.
Walter Koechner, "Solid–State Laser Engineering", 4th. Ed. Springer Series in Optical Scienced vol. 1 pp. 215 No date.
T.Y. Fan., "Heat Generation in Nd:YAG and Yb:YAG", IEEE J. Quantum Electron., vol. 29, pp. 1457–1459, (1993) No month.

* cited by examiner

*Primary Examiner*—Paul Ip
*Assistant Examiner*—Hung T Vy
(74) *Attorney, Agent, or Firm*—Birch, Stewart, Kolasch & Birch, LLP

(57) ABSTRACT

A solid-state laser oscillator comprising solid-state laser rods disposed coaxially in series with each other, radiating light when excited, and amplifying the light through stimulated emission. A solid-state laser rod exciting device excites any number of solid-state laser rods with a 90° optical rotator disposed coaxially and arranged between the rods. The rotator rotates a component of the light generated in the axial direction while heat lens compensating devices are disposed coaxially with the solid-state laser rods. A reflecting device and a partial reflection device are disposed coaxially and arranged, outside of the solid-state laser rods and heat lens compensating devices, for propagating the axially generated component of the light. An exciting source driving device drives the exciting sources included in the solid-state laser rod exciting device.

18 Claims, 6 Drawing Sheets

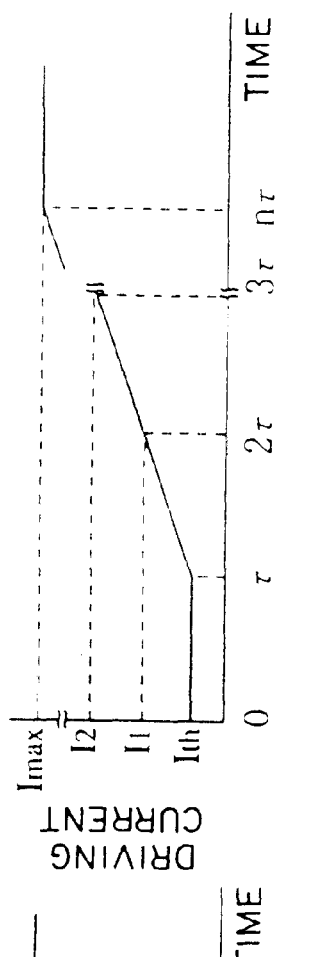
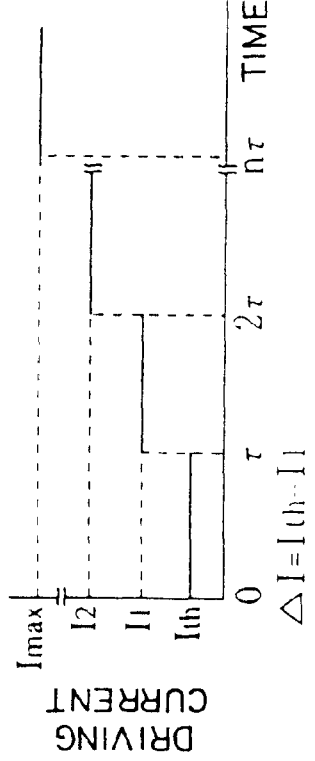
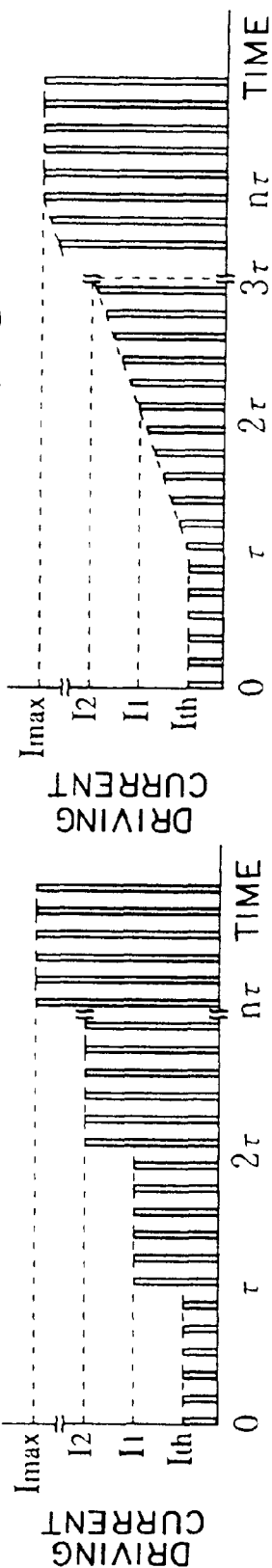

SOLID-STATE LASER OSCILLATOR

BACKGROUND OF THE INVENTION

1. Field of the Invention

The present invention relates to a solid-state laser oscillator using solid-state laser rods. More particularly, this invention is concerned with a solid-state laser oscillator having a high average-power transverse single-mode resonator which uses Nd:YAG rods to be excited by a high average-power laser diode.

2. Description of the Related Art

An active medium in a transverse single-mode oscillator is excited by an exciting light source such as a laser diode or a flash lamp. The excited active medium or any optical component is used to achieve transverse single-mode laser oscillation. This results in a transverse single-mode output. There are many approaches to exciting of an active medium. One of the approaches is end exciting.

End exciting is an exciting method for exciting a laser medium which is placed substantially along the optical axis of a resonator. The exciting is performed from the end of the laser medium, wherein a laser diode is mainly used for exciting. Exciting light output from the laser diode that is placed substantially along the optical axis of the resonator is incident substantially perpendicularly on an end of an active medium coated with an antireflection coating that is non-reflective to light having the same wavelength as the wavelength of the exciting light. The light is then absorbed into the active medium. The active medium is thus excited. The resonator consists of the excited active medium, total reflection mirrors, a partial reflection mirror, and an arbitrary optical component. The total reflection mirrors are located ahead of and behind the active medium, placed substantially along the optical axis of the resonator, and have a property of totally reflecting light having the same wavelength as the wavelength of laser light. The partial reflection mirror reflects part of the light having the same wavelength as the wavelength of the laser light. The excited active medium has electrons of high energy states made a transition to a lower energy state that is a stable state. At this time, photons are emitted. The total reflection mirrors and partial reflection mirror included in the resonator cause the photons to orbit. This stimulated emission performed by the active medium causes laser light of a specified wavelength to be amplified. Part of the laser light is emitted from the partial reflection mirror.

According to the end exciting method, the directivity of the laser diode is utilized in order to excite the solid-state laser medium so that transverse single-mode resonant laser beam alone will be propagated. Consequently, transverse single-mode laser oscillation is achieved highly efficiently. However, an output being generated from a single stripe in the laser diode is limited because the end of the laser diode is destroyed. For providing a high-power output, the number of laser diodes must be increased. This leads to deterioration in the directivity of the laser diode. Consequently, it becomes hard to excite the solid-state laser medium so that the transverse single-mode resonant laser beam alone will be propagated. Furthermore, since exciting light is converged on a microscopic area on the end of the solid-state laser medium, the power density of the exciting light is generally high. When the average power of exciting light is raised, the solid-state laser medium may be thermally destroyed with the exciting light. Existing transverse single-mode oscillators adopting the end exciting method have therefore been limited to applied fields in which low average-power laser light is needed.

High average-power solid-state lasers therefore adopt side exciting. Side exciting is an exciting method for exciting an active medium in a direction perpendicular to the optical axis of a resonator using an exciting source such as a laser diode or a flash lamp.

A transverse mode dependent on a laser medium is determined with resonance conditions. A transverse single mode is considered as a sort of pattern exhibited by laser light whose beam radius of the cross section of the laser light with the ray axis thereof as a center is the smallest. Low-order and high-order transverse modes are considered as sorts of patterns exhibited by laser light having larger beam radii. Now, assume that the laser medium itself is thought to serve as a mode selection aperture. If the size of an excited laser medium is equivalent to the beam radius of the laser light exhibiting the transverse single mode, the high-order transverse modes are not selected but the transverse single mode is selected. In contrast, when the size of the excited laser medium is larger than the beam radius of the transverse single-mode laser light, a high-order transverse mode is selected. At this time, laser oscillation is achieved to generate laser light exhibiting a multi-mode that is a combination of a plurality of waveguide modes including the transverse single mode, low-order modes, and high-order modes. A laser output is therefore multi-mode laser light. Multi-mode laser light is poorer in directivity than the transverse single-mode laser light. As the multi-mode laser light is propagated, it spreads widely. The multi-mode laser light is characterized in that when an attempt is made to converge the multi-mode laser light on a lens or the like, the cross section of the multi-mode laser light is not narrowed. Compared with a transverse single-mode laser, therefore, a multi-mode laser is of little worth for the purposes of configuring laser equipment that utilizes propagation of laser light or of performing machining with converged laser light.

For producing transverse single-mode light highly efficiently, the beam radius of transverse single-mode light propagated in a resonator must be equivalent to the size of a laser medium.

For improving the average power of transverse single-mode laser light, a laser medium must be excited with high-power exciting light. When the laser medium is excited with high average-power light, heat is generated in the laser medium due to the exciting light. Generation of heat optically distorts the laser medium. The thermal distortion leads to a loss of laser light orbiting within a resonator while being amplified. A gain of laser light to be produced by the resonator increases proportionally to the power of exciting light. However, as long as transverse single-mode laser oscillation is concerned, when the magnitude of thermal distortion is small, a loss stemming from thermal distortion increases in proportion to the square of the magnitude of thermal distortion. When the laser medium is excited with high-power exciting light, the loss increases more greatly than an increase in the gain of laser light produced by the resonator. The maximum power of laser light is therefore limited. For efficiently performing laser oscillation so as to generate high average-power transverse single-mode light, it is necessary to minimize the thermal distortion of the laser medium.

In general, a rod-shaped solid-state laser medium is referred to as a solid-state laser rod. When the solid-state laser rod is excited, heat is generated. The solid-state laser rod is therefore cooled with a coolant placed by the side thereof. Heat is distributed over the cross section of the solid-state laser rod. This results in a difference in temperature causing distribution of refractive indices. In particular, when the solid-state laser rod is realized with an isotropic medium made of an isotropic crystal of yttrium aluminum garnet ($Y_3Al_5O_{12}$) with an atom of neodymium (Nd) appended thereto (hereinafter Nd.YAG), the solid-state laser rod acts as a convex lens (which may be referred to as a heat lens) relative to laser light. As the power of exciting light is raised, the heat lens effect is intensified (the focal length of the solid-state laser rod gets shorter).

When a laser medium brings about any kind of birefringence, a heat lens effect exerted from the laser medium also provides a doublet lens effect. For designing a resonator capable of generating transverse single-mode light, the stability criteria of the resonator must be determined in consideration of the doublet lens effect. Nd:YAG is an isotropic crystal. However, birefringence occurs due to a photoelastic effect that relates to a stress stemming from distribution of temperatures. In particular, when a rod-shaped laser medium is employed, birefringence occurs due to radial polarization or peripheral polarization.

For resolving the foregoing drawback, two equally excited rod-shaped laser media, that is, two equally excited solid-state laser rods are employed, and a 90°optical rotator is interposed between the rods. The focal lengths offered by the rods and affected by the heat lens effect are thus averaged. This technique has proved effective.

A resonator that acts to efficiently generate high-power transverse single-mode light must be designed in such a manner that when a Nd:YAG rod serving as a mode selection aperture is excited from the side surface thereof, the beam radius of light coming out of the rod becomes optimal with application of maximum-power exciting light. On the other hand, as the power of exciting light is raised, the heat lens effect is intensified. At this time, a range of values in the stability domain within which the stability criteria of the resonator are set gets smaller in inverse proportion to the square of a beam radius. It becomes hard to retain the stability criteria in the small range of values despite application of high-power exciting light. For achieving transverse single-mode laser oscillation, the beam radius must be as large as the diameter of the rod serving as the mode selection aperture. Therefore, it is hard to achieve laser oscillation with application of high-power exciting light because the application of high-power exciting light intensifies the heat lens effect. Transverse single-mode laser oscillation is therefore limited to laser oscillation to be performed for generating low-power laser light with application of low-power exciting light because the heat lens effect remains suppressed with application of low-power exciting light.

As a solving system, a heat lens compensating device, such as a lens or a curvature mirror, is placed in a resonator. This is intended to shift an action point in the stability domain, which indicates the stability criteria of the resonator, to a range of values in the stability domain indicating the stability criteria thereof for acting on application of high-power exciting light. In this case, since the intense heat lens effect stemming from application of high-power exciting light is compensated, laser oscillation cannot be achieved with application of low-power exciting light. Moreover, when the heat lens effect is intensified, the range of values in the stability domain within which the stability criteria of the resonator can be set gets smaller in inverse proportion of the square of the beam radius of laser light. Therefore, when high-power exciting light is applied, the stability criteria of the resonator are confined to a smaller range of values in the stability domain. A difference from threshold power of exciting light to power resulting in a maximum laser output diminishes. A slight variation in the power of exciting light may presumably cause a large variation in the laser output. From this viewpoint, laser oscillation for generating high average-power transverse single-mode light has thought to be hard to realize because the intense heat lens effect caused by application of high-power exciting light must be compensated.

FIG. 11 shows the configuration of a known transverse single-mode resonator described in, for example, "Solid-state Laser Engineering" written by Walter Koechner (4th Edition, Springer Series in Optical Science, Vol. 1, P.215). Referring to FIG. 11, there are shown a transverse single-mode resonator 101, a first exciting source 103-1, a second exciting source 103-2, a first solid-state laser rod 104-1, a second solid-state laser rod 104-2, a 90° optical rotator 105, a reflecting device 107, a partial reflection device 108, a Brewster plate 109, transverse single-mode light 130, and transverse single-mode output light 131.

Referring to FIG. 11, the first solid-state laser rod 104-1 and second solid-state laser rod 104-2 are placed mutually coaxially in parallel with each other, The first solid-state laser rod 104-1 and second solid-state laser rod 104-2 absorb exciting light emitted from the first exciting source 103-1 and second exciting source 103-2 respectively located near the associated solid-state laser rods. The first solid-state laser rod 104-1 and second solid-state laser rod 104-2 are thus excited. The 90° optical rotator 105 is interposed between the first solid-state laser rod 104-1 and second solid-state laser rod 104-2 and placed coaxially with the solid-state laser rods. The first solid-state laser rod 104-1 and second solid-state laser rod 104-2 are realized with Nd:YAG lasers. When the solid-state laser rods are excited from the exciting sources, they exert a heat lens effect or a heat doublet lens effect. The inclusion of the two solid-state laser rods and 90° optical rotator enables compensation of the heat doublet lens effect.

The reflecting device 107 and partial reflection device 108 are placed coaxially with the solid-state laser rods and arranged perpendicularly outside the two solid-state laser rods. The reflecting device 107 has a convex reflecting surface, while the partial reflection device 108 has a concave partial reflection surface. The reflecting device 107 and partial reflection device 108 compensate the heat lens effects exerted from the two solid-state laser rods. Part of transverse single-mode light orbiting between the reflecting device 107 and partial reflection device 108 and having been amplified by the solid-state laser rods is transmitted by the partial reflection device 108. Consequently, the transverse single-mode output light 131 is provided as a laser output of the transverse single-mode resonator 101. The Brewster plate 109 is placed on the optical axis of the transverse single-mode resonator while tilted by a Brewster angle with respect to the optical axis of the transverse single-mode resonator. The transverse single-mode light has a linearly polarized light component thereof selected. The transverse single-mode output light 131 is therefore linearly polarized light.

In the related art shown in FIG. 11, a distance between the first solid-state laser rod 104-1 and reflecting device 107, a distance between the second solid-state laser rod 104-2 and partial reflection device 108, the curvature of the convex surface of the reflecting device 107, and the curvature of the concave surface of the partial reflection device 108 are varied arbitrarily. Thus, the beam radius of single-mode light coming out of the solid-state laser rods is made nearly equal to the radius of the solid-state laser rods. The transverse single-mode resonator is thus configured to generate transverse single-mode light, However, in the foregoing configuration, the heat doublet lens effect is not fully compensated for some reasons. One of the reasons is that the configuration of the resonator is asymmetric. The heat lens effect is exerted in a radial direction and a peripheral direction relative to a cross section of each solid-state laser rod. Since the radial and peripheral heat lens effects are exerted, the stability criteria of the resonator are set to fall within different ranges of values in the stability domain. Assume that the power of exciting light to be applied to the solid-state laser rods is low and the heat lens effects exerted by the solid-state laser rods are feeble. In this case, the beam radius of transverse single-mode light coming out of the solid-state laser rods may be made as large as the radius of the solid-state laser rods in order to provide a transverse-single mode output. As mentioned above, the stability criteria of the resonator are set to the different ranges of values in the stability domain in consideration of the radial and peripheral heat lens effects. The different ranges of values in the stability domain are largely overlapping. After the radial and peripheral heat lens effects are compensated, transverse single-mode laser oscillation can be achieved with the stability criteria set to fall within a common range between the overlapping range of values. In contrast, assume that the power of exciting light to be applied to the solid-state laser rods is high and the heat lens effects exerted by the solid-state laser rods are intense. For providing a transverse single-mode output, the beam radius of transverse single-mode light coming out of the solid-state laser rods is made as large as the radius of the solid-state laser rods. AS mentioned above, since the heat lens effects are intense, the stability criteria of the resonator are confined to a small range of values in the stability domain. Moreover, the stability criteria of the resonator must be set to fall within different ranges of values in the stability domain in consideration of the radial and peripheral heat lens effects. Besides, since the different ranges of values overlap a little, a common range between the overlapping ranges of values is very small. Consequently, the stability criteria of the transverse single-mode resonator are confined to the very small range of values. It is therefore hard to achieve laser oscillation.

The stability criteria of the transverse single-mode resonator are set to the small range of values in the stability domain so that the resonator will act optimally on application of high-power exciting light. Therefore, a difference between power of exciting light permitting laser oscillation and power of exciting light needed to provide a maximum laser output is very small. A laser output is therefore quite sensitive to a small variation in the power of exciting light and less stable.

As mentioned above, assuming that the related transverse single-mode resonator shown in FIG. 11 is used to construct a solid-state laser oscillator, once the intense heat lens effects exerted by the solid-state laser rods responsively to application of high exciting power are compensated, the stability criteria of the resonator are confined to a narrow range of values in the stability domain. Consequently, laser oscillation is hard to achieve. Even when laser oscillation is attempted, a laser output is sensitive to a slight variation in the power of exciting light and little stable.

SUMMARY OF THE INVENTION

Accordingly, an object of the present invention is to provide a solid-state laser oscillator capable of generating high average-power transverse single-mode output light on a highly stable basis with the stability criteria of a resonator set to fall within a wide range of values in the stability domain. Herein, a transverse single-mode resonator consists of two solid-state laser rods, two solid-state laser rod modules, a 90° optical rotator, two head lens compensating device, a reflecting device, a partial reflection device, an exciting source driving power supply, a supply current line, a supply current control device, a control current line, a parameter input device, and a setting signal line.

With the above object in view, the solid-state laser oscillator of the present invention comprises: any number of solid-state laser rods disposed coaxially in parallel with each other, radiating light when excited, and amplifying the light through stimulated emission; any number of solid-state laser rod exciting device for exciting the any number of solid-state laser rods; any number of 90° optical rotators disposed coaxially with the solid-state laser rods, arranged between the any number of solid-state laser rods, and rotating a component of the light generated in the axial direction; any number of heat lens compensating device disposed coaxially with the solid-state laser rods and located at any positions; a reflecting device and a partial reflection device, disposed coaxially with the solid-state laser rods and arranged outside all of the solid-state laser rods and heat lens compensating device, for propagating the axially generated component of the light; and an exciting source driving device for driving the exciting sources included in the solid-state laser rod exciting device, wherein a component of the light component, which is propagated between the reflecting device and partial reflection device, is transmitted by the partial reflection device and output as laser light.

The exciting source driving device may include an exciting source driving power supply for feeding a driving current used to drive the exciting sources.

The exciting source driving device may include: a parameter input unit for use in entering values of parameters, that is, driving conditions for the exciting source driving power supply; and a supply current control unit for controlling the exciting source driving power supply according to the driving conditions.

BRIEF DESCRIPTION OF THE DRAWINGS

The present invention will become more readily apparent from the following detailed description of the preferred embodiments of the present invention taken in conjunction with the accompanying drawings, in which:

FIG. 3A to 3D are graphs indicating the timing of raising a driving current stepwise and the timing of raising it continuously at a rate indicated with the slope of a curve;

DESCRIPTION OF THE PREFERRED EMBODIMENTS

Embodiments of the present invention will be described below.

First Embodiment

Figure 1:
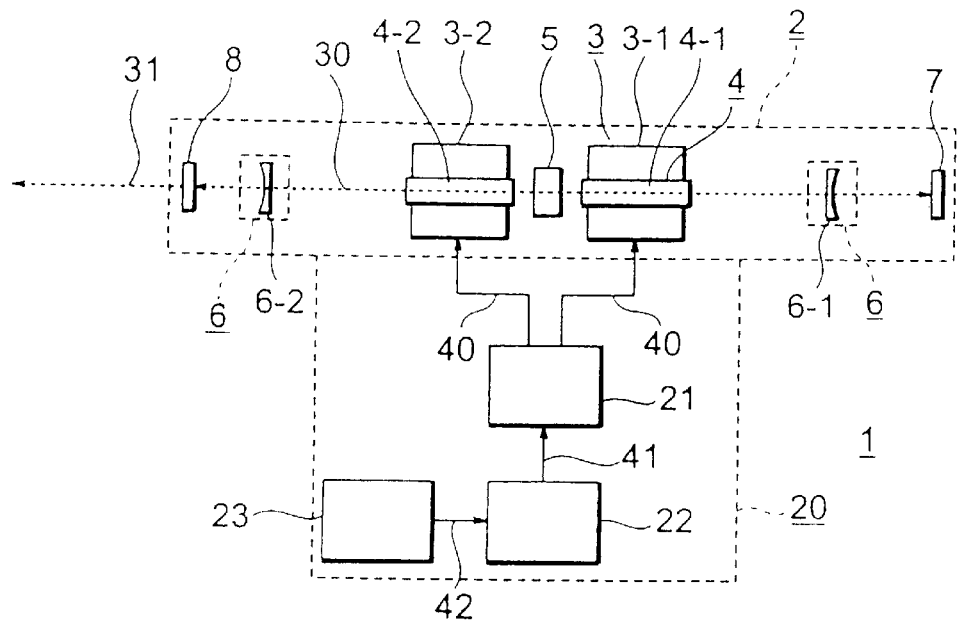
FIG. 1 shows the configuration of a solid-state laser oscillator in accordance with the first embodiment of the present invention.

FIG. 1 shows an example of the configuration of a solid-state laser oscillator in accordance with the first embodiment of the present invention. In FIG. 1, reference numeral 1 designates a solid-state laser oscillator, 2 designates a high average-power transverse single-mode resonator, 3 designates solid-state laser rod exciting modules including a first solid-state laser rod exciting module 3-1 and a second solid-state laser rod exciting module 3-2. Reference numeral 4 designates solid-state laser rods 4 including a first solid-state laser rod 4-1 and a second solid-state laser rod 4-2. Reference numeral 5 designates a 90° optical rotator, 6 designates heat lens compensating device including a first concave lens 6-1 and a second concave lens 6-2. Reference numeral 7 designates a reflecting device, 8 is a partial reflection device, 20 is an exciting source driving device, 21 is an exciting source driving power supply, 22 is a supply current control device, 23 is a parameter input device, 30 is a transverse single-mode light, 31 is transverse single-mode output light, 40 is supply current lines, 41 is a control signal line, 42 is a setting signal line.

Referring to FIG. 1, there is shown a solid-state laser oscillator 1 consisting mainly of a high average-power transverse single-mode resonator 2 and an exciting source driving device 20. The transverse single-mode resonator 2 consists of solid-state laser rod exciting modules 3, solid-state laser rods 4, a 90° optical rotator 5, heat lens compensating device 6, a reflecting device 7, and a partial reflection device 8. The exciting source driving device 20 consists of an exciting source driving power supply 21, a supply current control device 22, a parameter input device 23, supply current lines 40, a control signal line 41, and a setting signal line 42. The solid-state laser rod exciting modules 3 fall into a first solid-state laser rod exciting module 3-1 and a second solid-state laser rod exciting module 3-2. The solid-state laser rods 4 fall into a first solid-state laser rod 4-1 and a second solid-state laser rod 4-2. The heat lens compensating device 6 are realized with a first concave lens 6-1 and a second concave lens 6-2.

As described above, the solid-state laser rod exciting modules 3 include the first solid-state rod exciting module 3-1 and the second solid-state laser rod exciting module 3-2. The solid-state laser rods 4a include the first solid-state laser rod 4-1 and second solid-state laser rod 4-2. The solid-state laser rod exciting modules 3 are devices having an exciting source that radiates light used to excite the solid-state laser rods 4. The exciting source may be realized with a laser diode. A driving current ted by the exciting source driving power supply 21 is supplied to the solid-state laser rod exciting modules 3 over the supply current lines 40. The supplied driving current causes the exciting sources to radiate light. The solid-state laser rods 4 absorb exciting light and are thus excited. Population inversion occurs in the excited solid-state laser rods 4, whereby fluorescence takes place.

The first solid-state laser rod 4-1 and second solid-state laser rod 4-2 are placed coaxially in parallel with each other. In the first to sixth embodiments to be described below, for brevity's sake, the numbers of the solid-state laser rods 4 and solid-state laser rod exciting modules 3 are two. However, the numbers of the solid-state laser rods 4 and solid-state laser rod exciting modules 3 are not limited to two. Alternatively, any number of solid-state laser rods may be placed coaxially in parallel with each other, and any number of solid-state laser rod exciting modules 3 may be included. Moreover, the reflecting device 7 and partial reflection device 8 that are resonator mirrors included in the high average-power transverse single-mode resonator 2 are placed perpendicularly to the direction of the axes of the solid-state laser rods 4. The reflecting device 7 and partial reflection device 8 are arranged in the axial direction outside both the two solid-state laser rods 4. The reflecting device 7 has the property of highly efficiently reflecting light having the same wavelength as laser light, and may be realized with a full reflection mirror having a full reflection coating, which fully reflects light having the same wavelength as laser light, applied to a surface thereof. The partial reflection device 8 has the property of reflecting part of light having the same wavelength as laser light. The partial reflection device 8 may be realized with a partial reflection mirror having a partial reflection coating, which reflects part of light having the same wavelength as laser light, applied to a surface thereof.

A component of light radiated from the excited rods is propagated in a direction parallel to the direction of the axes of the two solid-state laser rods 4 and perpendicular to the reflecting device 7 and partial reflection device 8. The light component is orbited due to the reflecting device 7 and partial reflection device 8 and passed through the solid-state laser rods 4 many times. This causes stimulated emission to occur in the excited rods. A light output is therefore amplified. Finally, a large light output is provided. The solid-state laser rods 4 are excited with light of constant power When a light output is provided, a gain produced by the solid-state laser rods 4 decreases. Consequently, a loss of light occurring while the light orbits in the resonator and a decrease in the gain caused by provision of a light output are well-balanced with an increase in the gain caused by exciting. A component of the light output transmitted by the partial reflection device is supplied as a laser output.

A heat lens effect exerted in a radial direction relative to a cross section of the solid-state laser rods 4 is different from a heat lens effect exerted in a peripheral direction. The heat lens effect may be referred to as a heat doublet lens effect. An output light passed through and amplified by the solid-state laser rods 4 is subjected to astigmatism. For reducing astigmatism, the 90° optical rotator 5 is interposed between the first solid-state laser rod 4-1 and second solid-state laser rod 4-2 and placed in the direction of the axes of the solid-state laser rods. Consequently, laser light polarized in a radial direction by the first solid-state laser rod 4-1 is polarized in a peripheral direction by the second solid-state laser rod 4-2. In other words, the laser light undergoes the radial heat lens effect within the first solid-state laser rod 4-1, and undergoes the peripheral heat lens effect within the second solid-state laser rod 4-2. Likewise, laser light polarized in the peripheral direction by the first solid-state laser rod 4-1 is polarized in the radial direction by the second solid-state laser rod 4-2. The laser light undergoes the peripheral heat lens effect within the first solid-state laser rod 4-1, and undergoes the radial heat lens effect within the second solid-state laser rod 4-2. Owing to the two equally excited solid-state laser rods 4 and the 90° optical rotator 5 interposed between the two solid-state laser rods 4, the heat doublet lens effects occurring in the radial and peripheral directions are equalized. When high-power exciting light is applied, the beam radius is made as large as the radius of the rods. Although the stability criteria of the resonator are confined to a narrow range of values in the stability domain, the stability criteria can be set to fall within the same range of values irrespective of the peripheral and radial heat lens effects. Consequently, the stability criteria of the resonator can be set to fall within the largest possible range of values in the stability domain.

When a whole laser medium is excited according to the side exciting method, unlike when it is done according to the end exciting method, it is impossible to select the transverse single mode by limiting a gain. In a resonator using a laser medium to be excited according to the side exciting method, an aperture having the same size as the beam radius of single-mode light is defined in the resonator. The transverse single mode is thus selected by utilizing a difference in a light loss between modes. The aperture that is the mode selection aperture is realized with the end of the laser medium itself so that excited energy can be extracted from the laser medium with the highest possible efficiency.

For designing a resonator in which when a Nd:YAG rod is excited according to the side exciting, laser oscillation is achieved to efficiently generating high-power transverse single-mode light, the end of the rod itself is defined as the mode selection aperture and the beam radius of light coming out of the rod becomes optimal with application of maximum-power exciting light. When the power of exciting light is raised, the heat lens effect is intensified. In this case, a range of values in the stability domain within which the stability criteria of the resonator are set gets smaller in inverse proportion to the square of the beam radius. When the beam radius is made as large as the radius of the aperture of the laser medium, the stability criteria of the resonator are confined to a small range of values in the stability domain. It becomes hard to keep satisfying the stability criteria despite application of high-power exciting light. When laser oscillation is performed to generate transverse single-mode light, the beam radius must be as large as the radius of the aperture of the rod that is the end of the rod. The laser oscillation cannot therefore be achieved responsively to application of high-power exciting light because the application of high-power exciting light intensifies the heat lens effect.

As a solving device, the heat lens compensating device 6 for compensating the heat lens effect are included in the resonator. This makes it possible to shift an action point in the stability domain, which indicates the stability criteria of the resonator, to a range of values in the stability domain indicating stability criteria to be satisfied for acting on application of high-power exciting light. When the solid-state laser rods 4 are formed with Nd:YAG rods, the heat lens effects exerted by the rods are equivalent to a convex lens effect. The heat lens compensating device 6 may therefore be realized with concave lenses. Alternatively, the heat lens compensating device 6 may be realized with two convex lenses effective in transferring an optical image. The number of the heat lens compensating device 6 is not limited to two. Alternatively, any number of heat lens compensating device may be located at any positions and placed coaxially to the solid-state laser rods.

The high average-power transverse single-mode resonator 2 shown in FIG. 1 is a symmetric resonator. With the 90° optical rotator 5 located at the center of the resonator, the distance from the center to the first solid-state laser rod 4-1 is equal to the distance therefrom to the second solid-state laser rod 4-2. The first solid-state laser rod 4-1 and second solid-state laser rod 4-2 are excited equally. Likewise, the distance from the center of the resonator, at which the 90° optical rotator 5 is located, to the first concave lens 6-1 is equal to the distance therefrom to the second concave lens 6-2. Moreover, the distance from the center to the reflecting device 7 is equal to the distance therefrom to the partial reflection device 8. Although the heat doublet lens effects occur in the solid-state laser rods 4, that is, the radial heat lens effect and peripheral heat lens effect occur in the radial and peripheral directions relative to a cross section of the rods, the stability criteria of the resonator can be set to fall within the same range of values in the stability domain. Thus, the stability criteria can be set to fall within the largest possible range of values.

When the solid-state laser rods 4 are excited using exciting light of high power in order to generate high average-power laser light, the heat lens effects occurring in the solid-state laser rods are intensified greatly. A beam radius permitting provision of a transverse single-mode output is agreed with a beam radius determined with the solid-state laser rods 4. Consequently, the stability criteria of the resonator are confined to a very small range of values in the stability domain. After the heat lens effects or the heat doublet lens effects are compensated, the range of values in the stability domain may be shifted to a range of values within which the stability criteria fall responsively to application of high-power exciting light. Nevertheless, the range of values in the stability domain within which the stability criteria of the resonator can be set is very small.

Assuming that the solid-state laser rods 4 are realized with Nd:YAG rods, if laser light of a wavelength of 1.064 $\mu$m is generated, the heat lens effects are suppressed compared with when laser oscillation is not performed. The amount of heat dissipated when laser oscillation is not performed is calculated as 22.2% of heat stemming from exciting light absorbed into the laser medium. The amount of heat dissipated during laser oscillation is calculated as 24.1% as long as the laser oscillation is performed to generate laser light of a wavelength of 1064 nm using exciting light of a wavelength 801 nm. The amount of heat dissipated during laser oscillation is therefore estimated to be slightly larger. The heat lens effects exerted during laser oscillation may therefore be equal to or a bit more intense than those exerted when laser oscillation is not performed. However, experiments have demonstrated that the heat lens effects exerted during laser oscillation are feebler by about 15 to 30% than those exerted when laser oscillation is not performed.

Figure 2:
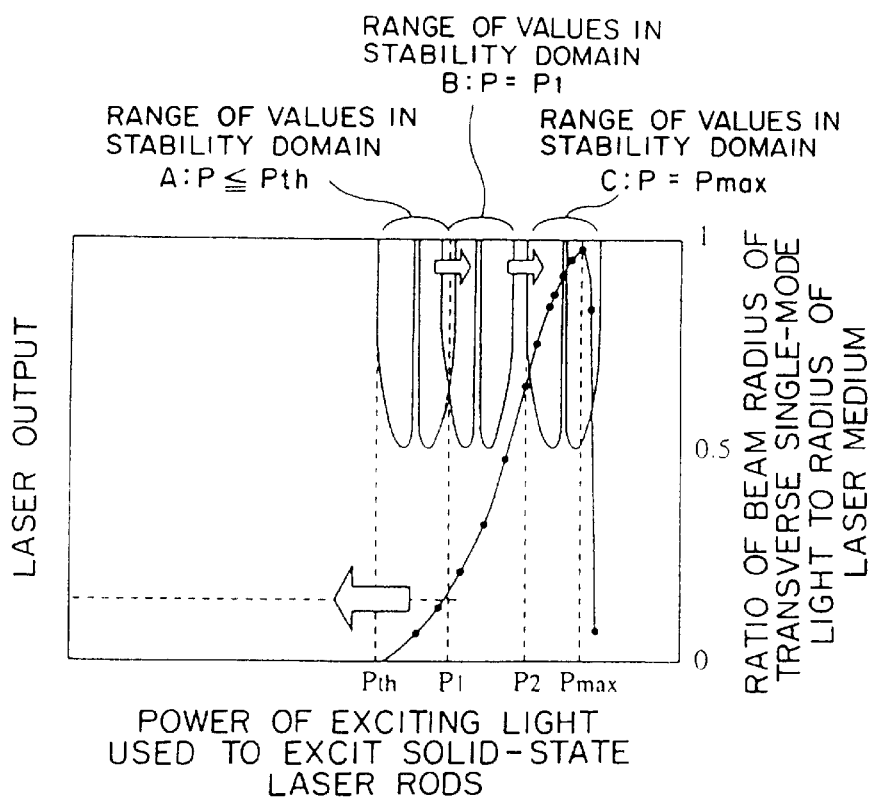
FIG. 2 is a graph indicating a laser output of a high average-power transverse single-mode resonator in accordance with the first embodiment of the present invention, and the ratio of the beam radius of transverse single-mode light coming out of a solid-state laser medium to the radius of the solid-state laser medium.

After laser oscillation is achieved, when energy is extracted from the solid-state laser rods 4, the heat lens effects decay. This phenomenon makes it possible to set the stability criteria of a resonator included in a high average-power transverse single-mode oscillator so that the stability criteria will fall within a wider range of values in the stability domain, though the range of values is still narrow. This advantage is graphically indicated in FIG. 2. Referring to FIG. 2, the axis of abscissas indicates the power of exciting light to be applied to the solid-state laser rods. The first axis of ordinates (left axis) indicates a laser output of the high average-power transverse single-mode resonator 2. The second axis of ordinates (right axis) indicates the ratio of the radius of the laser medium to the beam radius of transverse single-mode light coming out of the laser medium. When the beam radius of the transverse single-mode light is larger than the radius of the solid-state laser rods (the ratio of the beam radius of the transverse single-mode light to the radius of the laser medium exceeds 1), a loss of light occurring in the resonator is very large. Laser oscillation is not achieved. Assuming that the power of exciting light is equivalent to the threshold power (P=Pth), the stability criteria of the resonator is confined to a very narrow range of values (A) in the stability domain. Assume that the power of exciting light is increased to such an extent that the stability criteria of the resonator need not be set to fall within a range of values in the stability domain exceeding a range of values within which the stability criteria fall when laser oscillation is not performed (P=P1) In this case, after a laser output is provided, the intense heat lens effects exerted from the solid-state laser rods 4 when laser oscillation is not performed are suppressed. Consequently, the range of values in the stability domain must be shifted to a range of values (B) in the stability to be satisfied for acting on application of high-power exciting light. Thus, the power of exciting light is raised to such an extent that the stability criteria of the resonator need not be set to fall within a range of values exceeding a range of values within which the stability criteria fall instantaneously. Consequently, a larger laser output is provided. Therefore, the heat lens effects exerted by the solid-state laser rods are suppressed, and the range of values in the stability domain is shifted to the range of values within which the stability criteria fall responsively to application of higher-power exciting light. When a large laser output is provided, a gain produced by the solid-state laser rods 4 decreases. The output is therefore saturated finally. When the power of exciting light permitting provision of a maximum laser output (Pmax) is further increased, the heat lens effects will not be suppressed any longer because the laser output will not be increased. A range (C) of values in the stability domain need not be shifted to a range of values within which the stability criteria fall responsively to application of higher-power exciting light. Since the range of values is very narrow, the beam radius gets very large with a slight increase in the power of exciting light. Since the beam radius is large, a large loss of light occurs during orbiting in the resonator. Consequently, the laser output is reduced. With the reduction in the laser output, the range of values in the stability domain is shifted to a range of values within which the stability criteria fall responsively to application of lower-power exciting light. Consequently, the laser output is reduced sharply.

As mentioned above, the dynamic heat lens effects exerted from the solid-state laser rods and dependent on a change in the laser output are utilized. For achieving transverse single-mode laser oscillation, the stability criteria of the resonator must be set to fall within a narrow range of values in the stability domain. Nevertheless, the range of values in the stability domain can be maximized.

In general, a side exciting solid-state laser rod is cooled from the side surface of the laser rod. Heat dissipated from the laser rod is propagated towards the cooled side surface, and then subsides. From this viewpoint, a time constant $\tau$ serving as an index of time required until the laser rod returns to a steady state is expressed in relation to the material of the laser rod, the radius of a cross section thereof, and a heat propagation speed dependent on temperature as follows:

$$\tau = r_o^2 \cdot c\gamma/K$$

where $r_o$ denotes the radius of a cross section of the solid-state laser rod, c denotes the specific heat of a material made into the solid-state laser rod, $\gamma$ denotes the heat conductivity of the material made into the solid-state laser rod, and K denotes the temperature of the material made into the solid-state laser rod. Assuming that the solid-state laser rod is realized with an Nd:YAG rod having a radius of 2.0 mm, and the temperature is 300 K, $\tau$ equals to 0.96 sec. Moreover, assuming that the solid-state laser rod is realized with an Nd:YAG rod having a radius of 7.5 mm and the temperature is 300 K, $\tau$ equals to 13.5 sec. When the power of exciting light is raised or a laser output is provided, heat dissipated from the solid-state laser rod changes. In this case, the solid-state laser rod exerts a steady-state heat lens effect in a time equivalent to the time constant $\tau$. The power of exciting light is therefore raised to such as extent that the stability criteria of the resonator need not be set to fall within a range of values in the stability domain exceeding a range of values within which the stability criteria fall instantaneously due to the heat lens effect. Thereafter, when the time equivalent to the time constant $\tau$ has elapsed, the power of exciting light is further raised (a laser output is increased). Otherwise, the power of exciting light may be raised until the stability criteria of the resonator fall within the range of values to which stability criteria are set instantaneously due to the heat lens effects by taking the time equivalent to the time constant $\tau$. Thus, the stability criteria may be set to fall within a range of values in the stability domain to be met for acting on application of higher-power exciting light.

The configuration shown in FIG. 1 includes the supply current control device 22 capable of controlling the exciting source driving power supply 21 so that the exciting source driving power supply 21 can raise a driving current used to drive the exciting sources stepwise. The supply current control device 22 raises the driving current stepwise. Alternatively, the supply current control device 22 may raise the driving current continuously at a certain rate. Even when the exciting sources are actuated continuously or quasi-continuously, the same control can be given. FIG. 3A to FIG. 3D show a stepwise rise of the driving current and a continuous rise thereof at a certain rate. FIG. 3A and FIG. 3C show graphs indicating the stepwise rise of the driving current, while FIG. 3B and FIG. 3D show graphs indicating the continuous rise thereof at the certain rate. FIG. 3A and FIG. 3B indicate cases where the exciting sources are actuated continuously, while FIG. 3C and FIG. 3D indicate cases where the exciting sources are actuated quasi-continuously. A driving current Ith of a threshold level permitting the high average-power transverse single-mode resonator 2 to achieve laser oscillation is applied to the solid-state laser rods 4. The driving current is raised by a certain level at intervals of a time $\tau$ after the passage of a relaxation time $\tau$ required after the solid-state laser rods 4 dissipate heat. The rise in the driving current is smaller than the width of the range of values in the stability domain within which the stability criteria of the high average-power transverse single-mode resonator 2 fall instantaneously. Now, assume that the driving current is raised continuously at the certain rate. In this case, the driving current of a threshold level, Ith, permitting the high average-power transverse single-mode resonator 2 to achieve laser oscillation is applied to the solid-state laser rods 4. When the relaxation time or time constant τ required for the solid-state laser rods 4 to return to the steady state after heat dissipation has elapsed, the driving current is raised at a certain rate or a lower rate. The rate is determined with the width of the range of values in the stability domain within which the stability criteria of the high average-power transverse single-mode resonator 2 fall instantaneously and the time constant τ. The same applies to the cases where the exciting sources are actuated quasi-continuously. Control parameters, that is, driving conditions are an instantaneous rise ΔI in the driving current, the time constant τ, and the threshold current Ith. The control parameters can be designated arbitrarily using the parameter input device 23, and transmitted to the supply current control device 22 over the setting signal line 42.

As mentioned above according to the first embodiment, the solid-state laser oscillator 1 consists mainly of the high average-power transverse single-mode resonator 2 and the exciting source driving device 20. The high average-power transverse single-mode resonator 2 consists of the two solid-state laser rods 4, the two solid-state laser rod modules 3, the 90° optical rotator 5, the two heat lens compensating device 6, the reflecting device 7, and the partial reflection device 8. The two solid-state laser rods 4 are placed coaxially in parallel with each other. The two solid-state laser rod modules 3 each have an exciting source and excite the solid-state laser rods 4. The 90° optical rotator 5 is placed coaxially with the solid-state laser rods 4 and located at a middle point between the two solid-state laser rods 4. The two heat lens compensating device 6 are placed coaxially with the solid-state laser rods 4, and arranged outside the solid-state laser rods 4 while separated therefrom by the same distance. The reflecting device 7 and partial reflection device 8 are placed coaxially with the solid-state laser rods 4, and arranged outside the heat lens compensating device 6 while separated therefrom by the same distance. The exciting source driving device 20 consists of the exciting source driving power supply 21, the supply current lines 40, the supply current control device 22, the control signal line 41, the parameter input device 23, and the setting signal line 42. A driving current fed from the exciting source driving power supply 21 is transmitted to the modules 3 by way of the supply current lines 40. The supply current control device 22 controls the driving conditions to be set in the exciting source driving power supply 21. A control signal output from the supply current control device 22 is transmitted to the exciting source driving power supply 21 by way of the control signal line 41. The driving conditions designated using the parameter input device 23 are transmitted to the supply current control device 22 by way of the setting signal line 42. As described previously, the high average-power transverse single-mode resonator 2 in accordance with the present embodiment is a symmetric resonator. The heat doublet lens effects, that is, the radial heat lens effects and peripheral heat lens effects occurring in the radial and peripheral directions relative to the cross sections of the rods are exerted from the solid-state laser rods 4. Nevertheless, the stability criteria of the resonator can be set to the same range of values in the stability domain. Consequently, the stability criteria can be set to the largest possible range of values in the stability domain. Transverse single-mode output light 31 can be supplied with high average power on a highly stable basis with the stability criteria of the resonator set to the large range of values in the stability domain.

Second Embodiment

Figure 4:
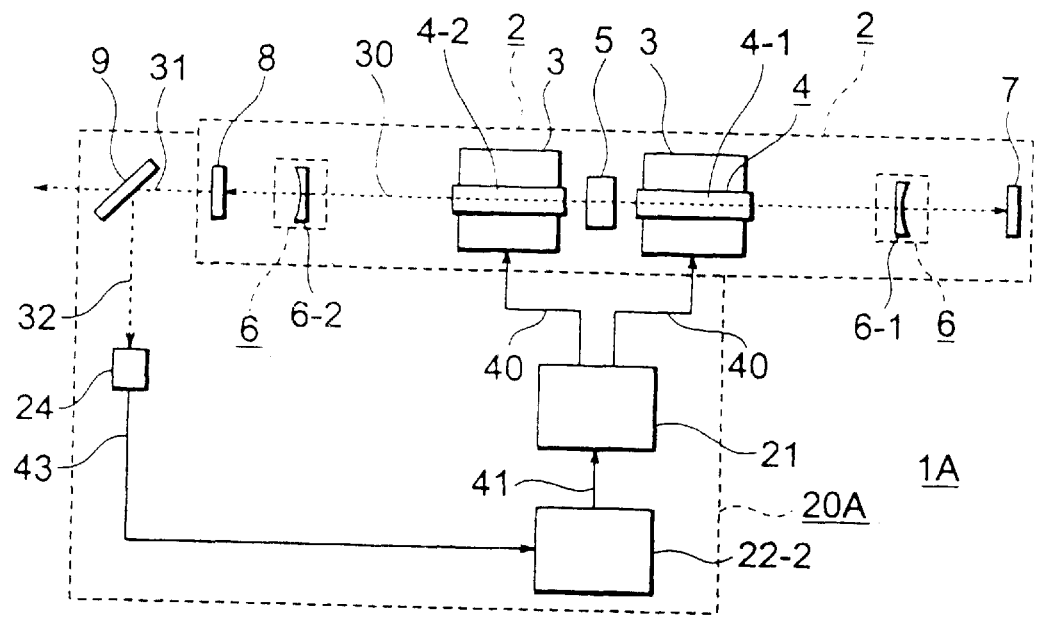
FIG. 4 shows the configuration of a solid-state laser oscillator in accordance with the second embodiment of the present invention.

FIG. 4 shows the configuration of a solid-state laser oscillator in accordance with another embodiment of the present invention. Referring to FIG. 4, there is shown a solid-state laser oscillator 1A consisting mainly of a high average-power transverse single-mode resonator 2 and an exciting source driving device 20A. The exciting source driving device 20A includes a beam splitter 9, a supply current control device 22-2, a light receiving device 24, a control signal line 41, an output signal line 43, an exciting source driving power supply 21 and a supply current lines 40. Reference numeral 32 denotes sample light. The other components are identical to those of the first embodiment. The same reference numerals will be assigned to the components, and the description of the components will be omitted.

Transverse single-mode light 31 supplied from the high average-power transverse single-mode resonator 2A is partly reflected from the beam splitter 9. Sample light 32 that is reflected light is received by the light receiving device 24. An electric signal proportional to the received light is transmitted to the supply current control device 22-2 over the output signal line 43. The light receiving device 24 is realized with, for example, a photodiode that operates at a high speed. The electric signal proportional to the sample light 32 is used to perform differentiation within the supply current control device 22-2. When the transverse single-mode light 31 increases with the passage of time, a signal resulting from differentiation, that is, a differential signal assumes a positive level. When the transverse single-mode light 31 decreases with the passage of time, the differential signal assumes a negative level. Within the supply current control device 22-2, a driving current fed to the exciting source driving power supply 21 is subjected to differentiation. When the driving current increases, a signal resulting from differentiation, that is, a differential signal assumes a positive value. When the driving current decreases, the differential signal assumes a negative value.

When the differential signal of the driving current and the differential signal of the electric signal proportional to the sample light are positive, the supply current control device 22-2 sends a control signal to the exciting source driving power supply 21 over the control signal line 41 so as to increase the driving current. When the differential signal of the driving current is positive but the differential signal of the electric signal proportional to the sample light is negative, a control signal is sent to the exciting source driving power supply 21 over the control signal line 41 in order to decrease the driving current. When the differential signal of the driving current is negative but the differential signal of the electric signal proportional to the sample light is positive, a control signal is sent to the exciting source driving power supply 21 over the control line 41 in order to decrease the driving current. When the differential signal of the driving current and the differential signal of the electric signal proportional to the sample light are negative, a control signal is sent to the exciting source driving power supply 21 over the control signal line 41 in order to increase the driving current.

After the supply current control device 22-2 transmits a control signal instructing an increase or decrease in the driving current to the exciting source driving power supply 21, the transverse single-mode output light 31 varies. Thereafter, a certain time elapses before the electric signal proportional to the sample light 32 is subjected to differentiation. The differential signal of the driving current and the differential signal of the electric signal proportional to the sample light are therefore delayed by a proper time. Thereafter, it is judged whether the differential signal of the driving current and the differential signal of the electric signal proportional to the sample light are positive or negative. The exciting source driving device 20 measures an increase or decrease in the transverse single-mode output light 31 caused by an increase or decrease in the driving current, and feeds back the measure. Consequently, laser oscillation can be achieved with the stability criteria of the high average-power transverse single-mode resonator 2A not deviated from the narrow range of values in the stability domain. Moreover, when the heat lens effects exerted by the solid-state laser rods 4 change due to supply of a laser output, the range of values in the stability domain may be shifted. Even in this case, the transverse single-mode output light 31 can be generated with the stability criteria of the resonator not deviated from the stability domain.

As mentioned above, according to the second embodiment, the exciting source driving device 20 consists of the beam splitter 9, exciting source driving power supply 21, supply current control device 22-2, light receiving device 24, control signal line 41, and output signal line 43. The exciting source driving device deals with the sample light 32. An increase or decrease in the transverse single-mode output light 31 derived from an increase or decrease in the driving current is measured and fed back. Laser oscillation can be achieved with the stability criteria of the resonator not deviated from the stability domain. The high average-power transverse single-mode output light 31 can be generated on a highly stable basis with the stability criteria of the resonator set in a large range of values in the stability domain.

Third Embodiment

Figure 5:
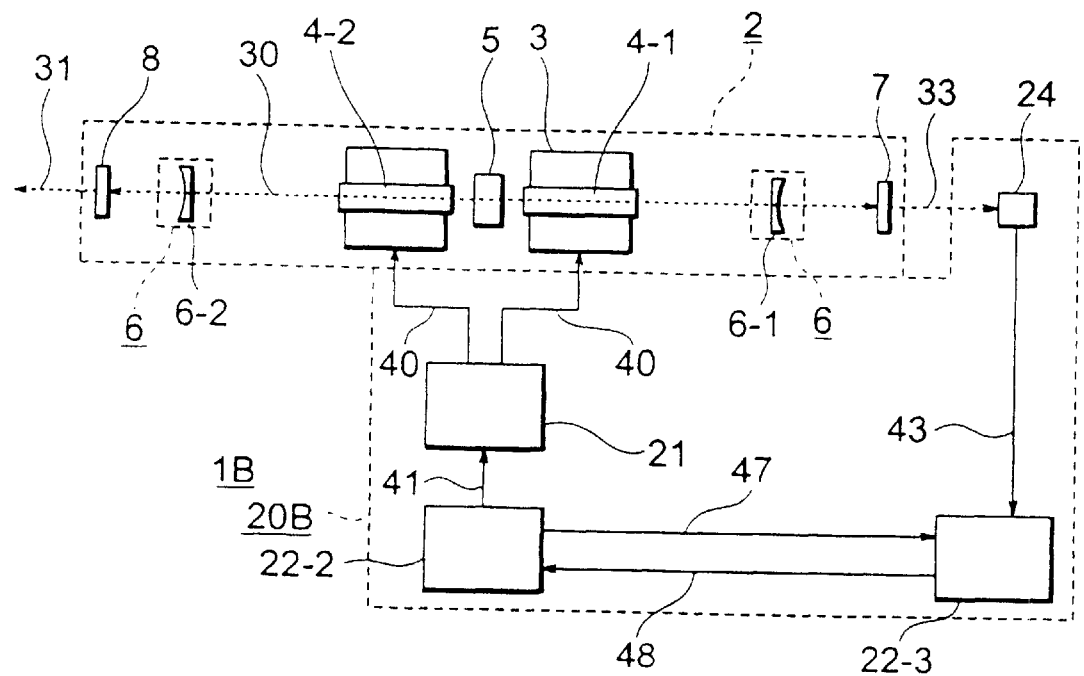
FIG. 5 shows the configuration of a solid-state laser oscillator in accordance with the third embodiment of the present invention.

FIG. 5 shows the configuration of a solid-state laser oscillator in accordance with another embodiment of the present invention. Referring to FIG. 5, there is shown a solid-state laser oscillator 1B having a first supply current control device 22-2, a second supply current control device 22-3, a differentiation signal line 47, and a judgment signal line 48. Reference numeral 33 denotes leakage light.

The high average-power transverse single-mode resonator 2 has the reflecting device 7 and partial reflection device 8 as resonator mirrors. Light transmitted by the partial reflection mirror 8 is supplied as transverse single-mode output light 31. The reflecting device 7 has the property of highly efficiently reflecting light that has the same wavelength as laser light. However, the reflectance is not 100% but in the order of 99.5 to 99.95%. Leakage light 33 proportional to transverse single-mode light 30 is therefore output from the reflecting device 7 exhibiting a high reflectance, though the amount of leakage light 33 is very small. The leakage light 33 is converted into an electric signal by the light receiving device 24 realized with, for example, a light receiving device that operates at a high speed, and then transmitted to the second supply current control device 22-3 over the output signal line 43. The electric signal proportional to the leakage light 33 is subjected to differentiation within the second supply current control device 22-3. When the transverse single-mode output light 31 increases with the passage of time, a signal resulting from differentiation, that is, a differential signal assumes a positive level. When the transverse single-mode output light 31 decreases with the passage of time, the differential signal assumes a negative level.

Within the first supply current control device 22-2, a driving current to be fed to the exciting source driving power supply 21 is subjected to differentiation. When the driving current increases, a positive signal is output to the second supply current control device 22-3 over the differentiation signal line 47. When the driving current decreases, a negative signal is output thereto. The second supply current control device 22-3 judges in the same manner as a counterpart employed in the second embodiment whether the differential signal of the driving current and the differential signal of the electric signal proportional to the leakage light 33 are positive or negative. The results of judgment are output to the first supply current control device 22-2 over the judgment signal line 48. Based on the results of judgment, the first supply current control device 22-2 transmits a control signal to the exciting source driving power supply 21 over the control signal line 41 so as to increase or decrease the driving current. The second supply current control device 22-3 thus compares the differential signal of the driving current with the differential signal of the electric signal proportional to the leakage light 33. A laser output can therefore be controlled in the same manner as that in the second embodiment. Even in this embodiment, similarly to the second embodiment, the supply current control device 22-2 transmits a control signal, which instructs increase or decrease of the driving current, to the exciting source driving power supply 21. The transverse single-mode output light 31 is varied in response to the control signal. Thereafter, a certain time elapses before the electric signal proportional to the received leakage light 33 is subjected to differentiation. For this reason, the differential signal of the driving current and the differential signal of the electric signal proportional to the leakage light are delayed by a proper time before it is judged whether they are positive or negative. According to this embodiment, the supply current control device is composed of two supply current control device. 22-2 and 22-3. Alternatively, the supply current control device may be a single supply current control device.

As mentioned above, according to the third embodiment, an exciting source driving device 20B consists of the exciting source driving power supply 21, first and second supply current control device 22-2 and 22-3, light receiving device 24, control signal line 41, output signal line 43, differentiation signal line 47, and judgment signal line 48. The exciting source driving device 20B deals with the leakage light 33. The third embodiment therefore has the same advantages as the second embodiment. Furthermore, according to this embodiment, the leakage light 33 is collected using the light receiving device 24 and used to give control. The configuration of the solid-state laser oscillator 1 having the high average-power transverse single-mode resonator 2 can therefore be simplified.

Fourth Embodiment

Figure 6:
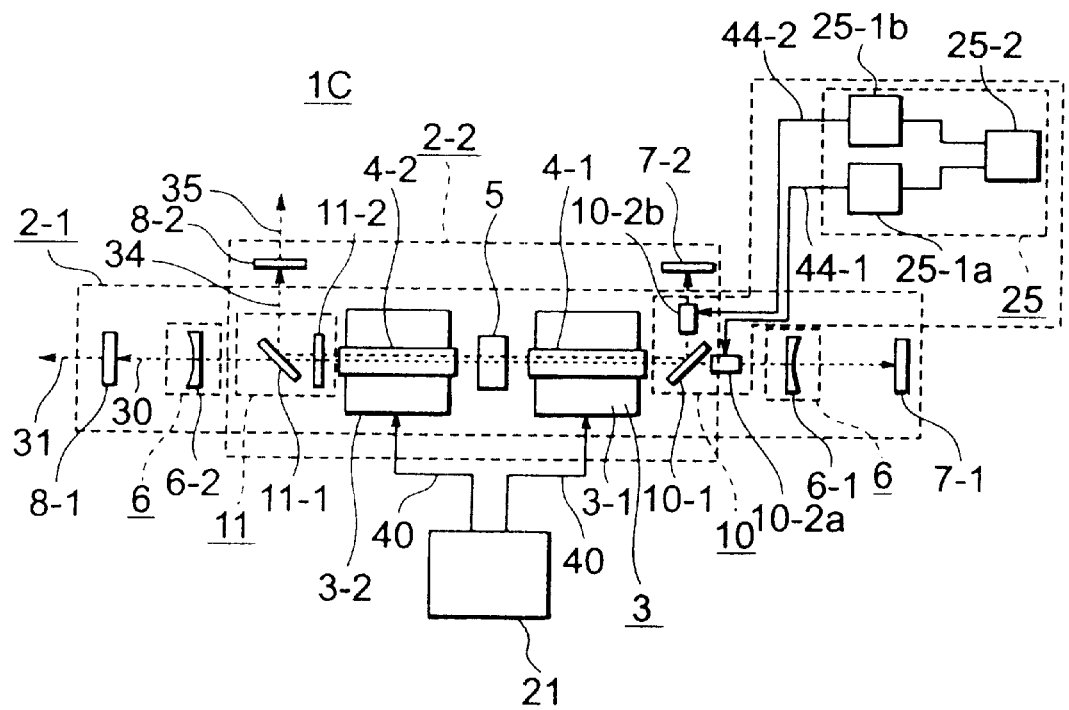
FIG. 6 shows the configuration of a solid-state laser oscillator in accordance with the fourth embodiment of the present invention.

FIG. 6 shows the configuration of a solid-state laser oscillator in accordance with another embodiment of the present invention. Referring to FIG. 6, there is shown a solid-state laser oscillator 1C consisting mainly of a high average-power transverse single-mode resonator 2-1, a high average-power transverse multi-mode resonator 2-2, a first optical path switching device 10, a second optical path switching device 11, an exciting source driving power supply 21, and an optical path switching control device 25. The optical path switching control device 25 consists of a first high-voltage power supply 25-1a, a second high-voltage power supply 25-1b, and a high-voltage power supply control unit 25-2. The solid-state laser oscillator 1C also includes solid-state laser rod exciting modules 3, solid-state laser rods 4, a 90° optical rotator 5, heat lens compensating device 6, a first reflecting device 7-1, a second reflecting device 7-2, a first partial reflection device 8-1, and a second partial reflection device 8-2. The solid-state laser rod exciting modules 3 fall into a first solid-state laser rod exciting module 3-1 and a second solid-state laser rod exciting module 3-2. The solid-state laser rods 4 fall into a first solid-state laser rod 4-1 and a second solid-scate laser rod 4-2. The heat lens compensating device 6 are realized with a first concave lens 6-1 and a second concave lens 6-2. The first optical path switching device 10 consists of a polarizer 10-1, a first Pockets cell 10-2a, and a second Pockets cell 10-2b. The second optical path switching device 11 consists of a polarizer 11-1 and a half-wave plate 11-2. The solid-state laser oscillator 1C further includes, supply current lines 40, a first high-voltage current line 44-1, and a second high-voltage current line 44-2. Reference numerals 30, 31, 34, and 35 denote transverse single-mode light, transverse single-mode output light, transverse multi-mode light, and transverse multi-mode output light respectively.

The solid-state laser oscillator 1C consists of the high average-power transverse single-mode resonator 2-1, high average-power transverse multi-mode resonator 2-2, first optical path switching device 10, second optical path switching device 11, exciting source driving power supply 21, and optical path switching control device 25. The transverse single-mode resonator 2-1 has the same configuration as the transverse single-mode resonator 2 in the first embodiment. The heat lens effects, or more particularly, the heat doublet lens effects exerted by the solid-state laser rods 4 are compensated using the heat lens compensating device 6 and 90° optical rotator 5. Thus, high-power transverse single-mode light can be generated with application of high-power exciting light. In the configuration shown in FIG. 6, the optical path switching device 10 and 11 are placed along the optical axis of the high average-power transverse single-mode resonator 2-1 with the two solid-state laser rods 4 between them. The first optical switching device 10 and first solid-state laser rod 4-1 adjoin the second optical switching device 11 and second solid-state laser rod 4-2. The optical path switching device 10 and 11 transmit or reflect laser light. The second reflecting device 7-2 is placed along the ray axis of light, which is reflected from the first optical path switching device 10, perpendicularly to the reflected light in the direction of the reflected light. The second partial reflection device 8-2 is placed on the ray axis of light, which is reflected from the second optical path switching device 11, perpendicularly to the reflected light in the direction of the reflected light. Otherwise, the second partial reflection device 8-2 may be associated with the first optical path switching device 10 and the reflecting device 7 may be associated with the second optical path switching device 11.

Light may be propagated along an optical path linking the second reflecting device 7-2, first optical path switching device 10, first solid-state laser rod 4-1, 90° optical rotator 5, second solid-state laser rod 4-2, second optical path switching device 11, and second partial reflection device 8-2. A resonator in which light is propagated along the optical path can be designed to have a small overall length. The beam radius of transverse single-mode light to be generated by the solid-state laser rods can therefore be made sufficiently smaller than the radius of the laser rods. Consequently, the solid-state laser rods 4 can generate higher-order transverse-mode light having a larger beam radius. This permits transverse multi-mode oscillation. The high average-power transverse multi-mode resonator 2-2 consists of the two solid-state laser rods 4, 90° optical rotator 5, first optical path switching device 10, second optical path switching device 11, second reflecting device 7-2, and second partial reflection device 8-2. Light resonated in the resonator is transverse multi-mode light 34. Light transmitted by the second partial reflection device 8-2 is transverse multi-mode output light 35. The high average-power transverse multi-mode resonator 2-2 has a short overall length. The stability criteria of the resonator 2-2 can therefore be set to fall within the stability domain irrespective of whether the power of exciting light is low or high. Consequently, the transverse multi-mode output light 35 is supplied as a laser output whose power is proportional to the power of exciting light and which varies on a stable basis.

When laser light is of the transverse single mode, if the laser light is propagated, it spreads a little. If the laser light is converged on a lens or the like, it converges at a spot of a small radius. This characteristic of laser light is useful in various applied fields of lasers. However, when an exciting source emits high average-power light, the stability domain of a resonator is confined to a small range in the stability domain because of the thermal distortion of a laser medium. Laser oscillation is therefore hard to achieve. In contrast, when laser light is of the transverse multi-mode, if the laser light is propagated, the beam radius thereof gets larger than that of the transverse single-mode light. Moreover, when the transverse multi-mode light is converged on a lens or the like, it converges at a spot of a large radius. However, when laser oscillation is performed to generate transverse multi-mode light, even if the power of the transverse multi-mode light is high on average, the stability criteria of the resonator can be set to fall within a large range in the stability domain. A laser output can therefore be provided on a stable basis in proportion to the power of exciting light. According to the fourth embodiment, the high average-power transverse multi-mode resonator 2-2 whose stability criteria can be set to fall within a large range in the stability domain is used to achieve laser oscillation. The laser output is provided in order to suppress the heat lens effects exerted by the solid-state laser rods 4. Thereafter, the optical path switching device 10 and 11 are used to switch optical paths, whereby the transverse single-mode resonator 2-1 is activated. When the transverse multi-mode resonator 2-2 is active, the heat lens effects have been suppressed on a stable basis because the laser output has been provided. When the transverse single-mode resonator 2-1 is activated in turn, the driving current is increased little by little until the heat lens effects change. It is unnecessary to control the driving current so as to provide a large laser output finally. Moreover, high average-power transverse single-mode light can be generated instantaneously (immediately).

As indicated with dashed lines in FIG. 6, the first optical path switching device 10 may be composed of the polarizer 10-1, first Pockels cell 10-2a, second Pockels cell 10-2b, and optical path switching control device 25. Moreover, the optical path switching control device 25 may be composed of the first high-voltage power supply 25-1a, second high-voltage power supply 25-1b, high-voltage power supply control unit 25-2, first high-voltage current line 44-1, and second high-voltage current line 44-2. The first and second Pockels calls 10-2a and 10-2b are sorts of light modulators having an electrooptic crystal and making the most of the Pockels effect. When a voltage is applied to the crystal, the direction of polarization of light passing through the crystal is changed. The first high-voltage power supply 25-1a and second high-voltage power supply 25-1b apply a specified voltage to the first Pockels cell 10-2a and second Pockels cell 10-2b. With application of the specified voltage, the direction of polarization of light passing once through the Pockels cell is changed by one quarter-wavelength. Without the application of the specified voltage, the direction of polarization of passing light will not be changed.

Due to the inclusion of the polarizers, polarized light propagated in the transverse single-mode resonator is linearly polarized light to be passed through the polarizer 10-1. Polarized light propagated in the transverse multi-mode resonator is linearly polarized light to be reflected from the polarizer 10-1. When the voltage is applied to the first Pockels cell 10-2a, light travels from the first solid-state laser rod 4-1 towards the polarizer 10-1. The linearly polarized light of the light traveling towards the polarizer passes through the polarizer 10-1. The light passes through the first Pockels cell 10-2a twice because it reflects from the reflecting device 7-1. The linearly polarized light is therefore turned by 90° in total and returned to the polarizer 10-1. The linearly polarized light to be passed through the polarizer 10-1 is turned by 90°. This device that the light is reflected from the polarizer 10-1. Consequently, laser light is propagated outside the transverse single-mode resonator. The transverse single-mode resonator is thus inactivated. The transverse single-mode output light 31 is therefore not generated. Moreover, when no voltage is applied to the first Pockels cell 10-2a, the direction of polarization of light passing through the first Pockels cell 10-2a is not changed. The light is then reflected from the reflecting device 7-1 and therefore passes through the first Pockels cell 10-2a twice. The direction of polarization of the light remains intact, and the light therefore passes through the polarizer. The transverse single-mode resonator is thus activated.

Likewise, when transverse multi-mode laser oscillation is designated, if a voltage is applied to the second Pockels cell 10-2b, light travels from the first solid-sate laser rod 4-1 to the polarizer 10-1 and a component of the light reflects from the polarizer 10-1. The linearly polarized light of the component is reflected from the polarizer 10-1. The light passes through the second Pockels cell 10-2b twice because it reflects from the reflecting device 7-2. The linearly polarized light is therefore turned 90° in total and returned to the polarizer 10-1. The linearly polarized light to be reflected from the polarizer 10-1 is turned by 90°. This device that the light is transmitted by the polarizer 10-1. Consequently, laser light is propagated outside the transverse multi-mode resonator. The transverse multi-mode resonator is therefore inactivated. The transverse multi-mode output light 34 is not generated. In contrast, when no voltage is applied to the second Pockels cell 10-2b, light passes through the Pockels cell 10-2b. The direction of polarization of the light is therefore not changed. The direction of polarization of the light having passed through the second Pockels cell 10-2b twice due to the presence of the reflecting device 7-2 remains intact to permit the light to reflect from the polarizer. The transverse multi-mode resonator is therefore activated.

When a voltage is applied to the first Pockels cell 10-2a and no voltage is applied to the second Pockels cell 10-2b, transverse single-mode light is not output but transverse multi-mode light is output. In contrast, when no voltage is applied to the first Pockels cell and a voltage is applied to the second Pockels cell 10-2b, only the transverse single-mode light is output. The high-voltage power supply control unit 25-2 is used to control switching of application and non-application of a voltage from the high-voltage power supply 25-1a or second high-voltage power supply 25-1b to the Pockels cell. Thus, a laser output of the solid-state laser oscillator 1C can be changed from transverse single-mode light to transverse multi-mode light or vice versa.

When a voltage is applied to both the first Pockels cell 10-2a and second Pockels cell 10-2b, if no laser light is output, energy to be accumulated in the solid-state laser rods 4 into which light is absorbed increases. When the applied voltage is nullified thereafter, the accumulated energy is released. This results in a laser output whose peak power becomes instantaneously high. When the laser output is provided, the energy accumulated in the solid-state laser rods 4 decreases. The laser output decreases accordingly. When the applied voltage is nullified, a laser output whose peak power is high and whose pulse duration is short is provided. When the application and non-application of the voltage are thus highly repeated, a laser output whose pulse duration is short and whose peak power is high can be provided highly repeatedly. This operation may be referred to as Q-switching. The voltage is applied continuously to the first Pockels cell 10-2a, and the voltage is applied to the second Pockels cell 10-2b. When pulsed laser light is generated repeatedly without application of the voltage, Q-switched transverse multi-mode light is output. Moreover, the voltage is applied continuously to the second Pockels cell 10-2b, and the voltage is applied to the first Pockels cell 10-2a. When pulsed laser light is generated repeatedly without application of the voltage, Q-switched transverse single-mode light is output.

The second optical path switching device 11 consists of the polarizer 11-1 and half-wave plate 11-2. Light traveling from the first solid-state laser rod 4-1 to the second solid-state laser rod 4-2 has the direction of polarization thereof changed 90° by the 90° optical rotator 5. Assuming that the light passes through the half-wave plate 11-2 once and has the direction of polarization thereof changed 90°, the half-wave plate 11-2 is interposed between the second solid-state laser rod 4-2 and polarizer 11-1 and placed perpendicularly to and coaxially with the solid-state laser rods. Consequently, linearly polarized light to be transmitted by the polarizer 10-1 is also transmitted by the polarizer 11-1. Linearly polarized light to be reflected from the polarizer 10-1 is also reflected from the polarizer 11-1.

As described previously, when no voltage is applied to a Pockels cell, the direction of polarization of light passing through the Pockels cell is not changed. When a voltage is applied to the Pockels cell, the direction of polarization thereof is changed. The Pockels cell may exhibit another property. Specifically, when no voltage is applied to the Pockels cell, the direction of polarization of light passing through the Pockels cell may be changed by one quarter-wavelength. When the voltage is applied thereto, the direction of polarization of light passing through the Pockels cell once may not be changed at all or may be changed by one half-wavelength. In this case, when no voltage is applied, a resonator is inactive and no laser output is provided. When the voltage is applied, the resonator is active and the laser output is provided.

Figure 7:
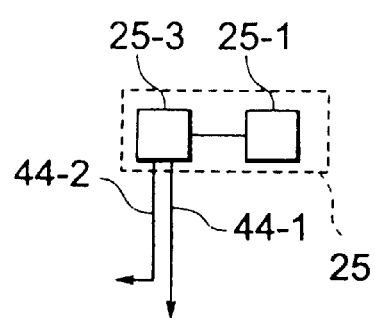
FIG. 7 shows another example of the configuration of an optical path switching control device included in the solid-state laser oscillator shown in FIG. 6.

The optical path switching control device 25 may be, as shown in FIG. 7, composed of one high-voltage power supply 25-1 and a voltage output switching device 25-3. In this case, the high-voltage power supply 25-1 always develops a voltage permitting light, which passes through a Pockels cell, to turn by one quarter-wavelength. The voltage output switching device 25-3 switches a voltage output destination from the first high-voltage current line 44-1 to the second high-voltage current line 44-2 or vice versa. Thus, a voltage can be applied to either the first Pockels cell 10-2a or second Pockels cell 10-2b. Either transverse single-mode light or transverse multi-mode light is output. The employment of the voltage output switching device 25-3 makes it possible to decrease the number of high-voltage power supplies to one. This leads to a simplified configuration.

As mentioned above, according to the fourth embodiment, the solid-state laser oscillator 1C consists of the first solid-state laser rod exciting module 3-1, second solid-state laser rod exciting module 3-2, first solid-state laser rod 4-1, second solid-state laser rod 4-2, 90° optical rotator 5, first concave lens 6-1, second concave lens 6-2, first reflecting device 7-1, second reflecting device 7-2, first partial reflection device 8-1, second partial reflection device 8-2, polarizer 10-1, first Pockels cell 10-2a, second Pockels cell 10-2b, polarizer 11-1, half-wave plate 11-2, exciting source driving power supply 21, high-voltage power supply 25-1, first high-voltage power supply 25-1a, second high-voltage power supply 25-1b, high-voltage power supply control unit 25-2, voltage output switching device 25-3, supply current lines 40, first high-voltage current line 44-1, and second high-voltage current line 44-2. High average-power transverse single-mode light can be output instantaneously. Moreover, transverse multi-mode light, transverse single-mode light, Q-switched transverse multi-mode light, and Q-switched transverse single-mode light can be generated selectively.

Fifth Embodiment

Figure 8:
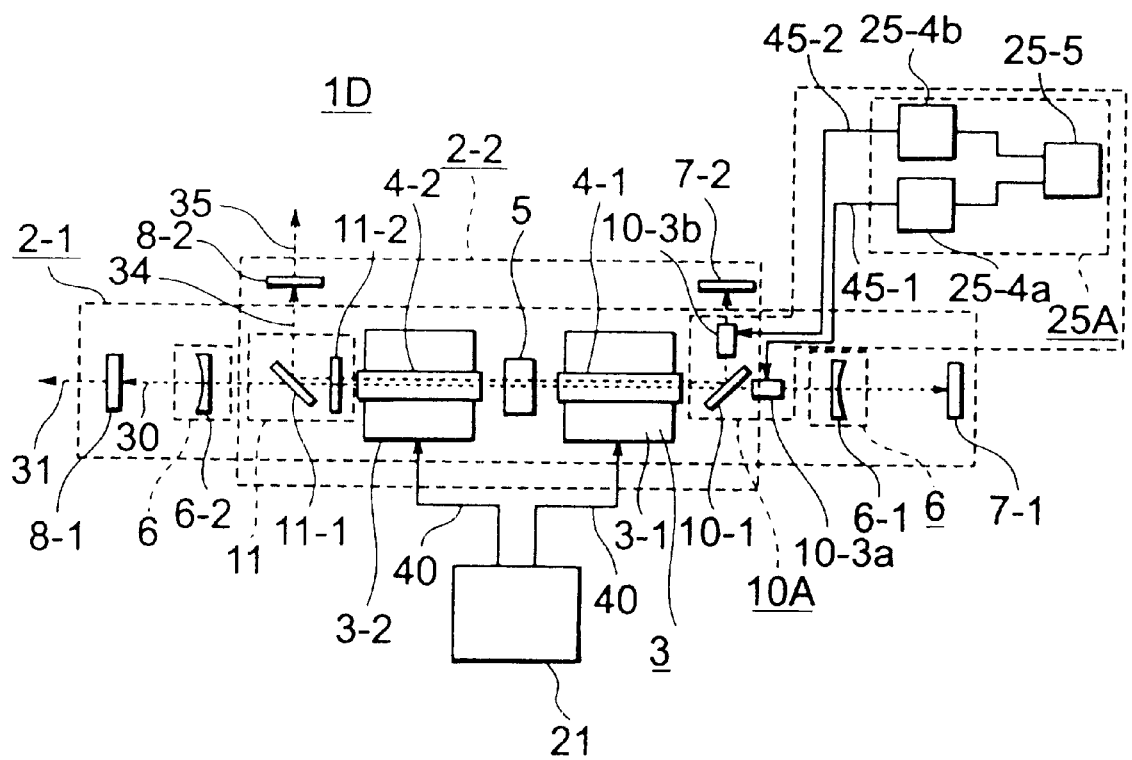
FIG. 8 shows the configuration of a solid-state laser oscillator in accordance with the fifth embodiment of the present invention.

FIG. 8 shows the configuration of a transverse single-mode laser oscillator in accordance with another embodiment of the present invention. Referring to FIG. 8, there is shown a first optical path switching device 10A consisting of a polarizer 10-1, a first acoustooptic device 10-3a, a second acoustooptic device 10-3b, an optical path switching control device 25A, a first current line 45-1, and a second current line 45-2. The optical path switching control device 25A consists of a first acoustooptic device driving power supply 25-4a, a second acoustooptic device driving power supply 25-4b, and an acoustooptic device driving power supply control unit 25-5. The optical path switching control device 25A may be composed of an acoustooptic device driving power supply 25-4 and a driving current switching device 25-6. The other components are identical to those of the fourth embodiment. The same reference numerals will be assigned to the identical components, and the description of the components will be omitted.

An acoustooptic device is a device making the most of Bragg diffraction attributable to the acoustooptic effect. When an acoustic wave is generated in an acoustooptic device, light passing through the acoustooptic device is diffracted due to the diffraction of ultrasonic waves. Diffracted light contains higher-order light aside from 0-order light. The 0-order light has the same ray axis as the light incident on the acoustooptic device. The higher-order light has its traveling direction varied spatially, and is propagated in a direction different from the direction of the 0-order light. When the acoustooptic device is located at a proper position, the 0-order light can be minimized and the higher-order light can be maximized. Light passing through the acoustooptic device is propagated in a direction different from the optical axis of a resonator. Consequently, laser oscillation is not achieved and no laser output is provided.

As shown in FIG. 8, the first acoustooptic device 10-3a is interposed between the polarizer 10-1 and reflecting device 7-1 and placed along the optical axis of the transverse single-mode resonator. The second acoustooptic device 10-3b is interposed between the polarizer 10-1 and reflecting device 7-2 and placed along the optical axis of the transverse multi-mode resonator. The first acoustooptic device driving power supply 25-4a for driving the first acoustooptic device 10-3a and the second acoustooptic device driving power supply 25-4b for driving the second acoustooptic device 10-3b are driven by the acoustooptic device driving power supply control unit 25-5 according to arbitrary timing. When the first acoustooptic device 10-3a is driven but the second acoustooptic device 10-3b is not driven, transverse single-mode laser oscillation is not achieved but transverse multi-mode laser oscillation is achieved. Transverse multi-mode light is therefore output. In contrast, when the first acoustooptic device 10-3a is not driven but the second acoustooptic device 10-3b is driven, transverse multi-mode laser oscillation is not achieved but transverse single-mode laser oscillation is achieved. Transverse single-mode light is therefore output.

When the first acoustooptic device 10-3a and second acoustooptic device 10-3b are driven, no laser output is provided. At this time, energy to be accumulated in the solid-state laser rods 4 into which exciting light is absorbed increases. When the applied voltage is nullified, the accumulated energy is released. A laser output whose peak power becomes instantaneously high is provided. When the laser output is provided, the energy accumulated in the solid-state laser rods 4 decreases. This causes the laser output to decrease. When driving an acoustooptic device is stopped, a laser output whose peak power is high and whose pulse duration is short is provided. When driving of this kind of acoustooptic device and non-driving thereof are repeated, a laser output whose pulse duration is short and whose peak power is high is provided repeatedly. This operation may be referred to as Q-switching. Consequently, although the first acoustooptic device 10-3a is driven continuously and the second acoustooptic device 10-3b is driven, pulsed laser light to be generated with no acoustooptic device driven is output repeatedly. Q-switched transverse multi-mode light is thus output. In contrast, although the second acoustooptic device 10-3b is driven continuously and the first acoustooptic device 10-3a is driven, pulsed laser light to be generated with no acoustooptic device driven is output repeatedly. Q-switched transverse single-mode light is thus output.

Figure 9:
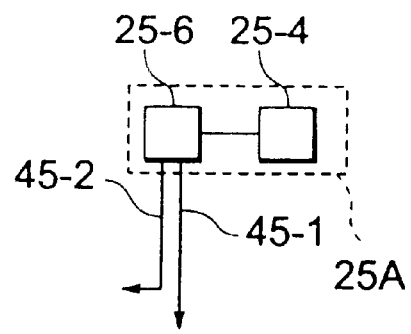
FIG. 9 shows another example of the configuration of an optical path switching control device included in the solid-state laser oscillator shown in FIG. 8.

The optical path switching control device 25A may be, as shown in FIG. 9, composed of one acoustooptic device driving power supply 25-4 and the driving current switching device 25-6. This leads to a simplified configuration.

As mentioned above, according to the fifth embodiment, the laser oscillator includes the first optical path switching control device 10A consisting of the polarizer 10-1, first acoustooptic device 10-3a, second acoustooptic device 10-3b, optical path switching control device 25A, first current line 45-1, and second current line 45-2. The optical path switching control device 25A consists of the first acoustooptic device driving power supply 25-4a, second acoustooptic device driving power supply 25-4b, and acoustooptic device driving power supply control unit 25-5, or of the acoustooptic device driving power supply 25-4 and driving current switching device 25-6. High average-power transverse single-mode light can be output instantaneously. Moreover, transverse multi-mode light, transverse single-mode light, Q-switched transverse multi-mode light, and Q-switched transverse single-mode light can be output selectively.

Sixth Embodiment

Figure 10:
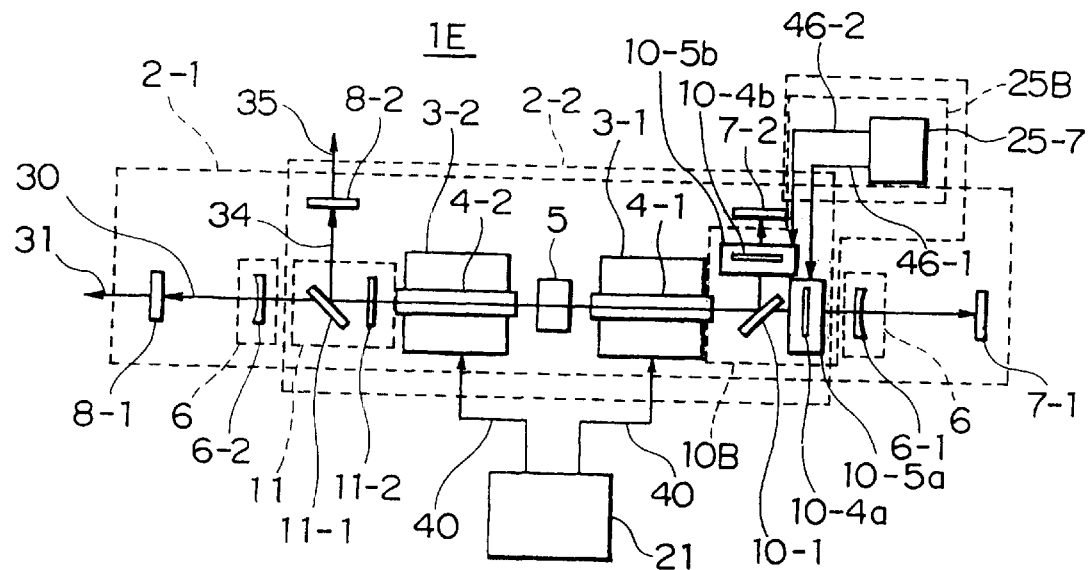
FIG. 10 shows the configuration of a solid-state laser oscillator in accordance with the sixth embodiment of the present invention.
Figure 11:
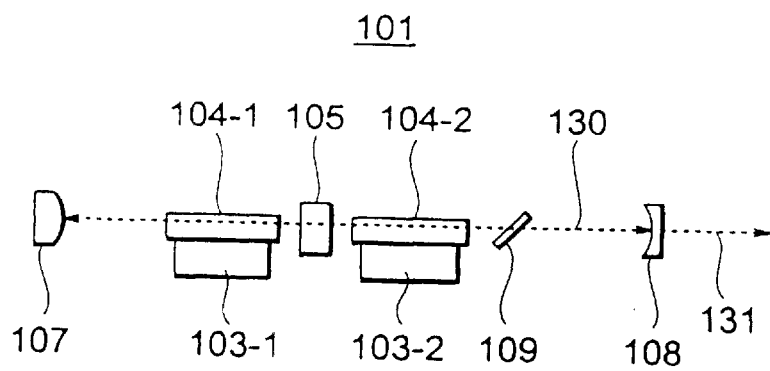
FIG. 11 shows the configuration of a known transverse single-mode resonator.

FIG. 10 shows the configuration of a single-mode laser oscillator in accordance with another embodiment of the present invention. Referring to FIG. 10, there is shown a first optical path switching device 10B composed of a polarizer 10-1, a first quarter-wave plate 10-4a, a second quarter-wave plate 10-4b, a first rotating device 10-5a, and a second rotating device 10-5b, an optical path switching control device 25B having a rotating device control unit 25-7, a first current line 46-1, and a second current line 46-2.

As shown in FIG. 10, the first quarter-wave plate 10-4a is interposed between the polarizer 10-1 and reflecting device 7-1 and placed perpendicularly to the transverse single-mode resonator along the optical axis of the transverse single-mode resonator. The second quarter-wave plate 10-4b is interposed between the polarize 10-1 and reflecting device 7-2 and placed perpendicularly to the transverse multi-mode resonator along the optical axis of the transverse multi-mode resonator. The first rotating device 10-5a and second rotating device 10-5b have the ability to rotate the first quarter-wave plate 10-4a or second quarter-wave plate 10-4b, and may be realized with motor-driven rotator holders. The first rotating device 10-5a and second rotating device 10-5b hold the external surfaces of the first quarter-wave plate 10-4a and second quarter-wave plate 10-4b respectively, but do not block the optical axes of the single-mode resonator and multi-mode resonator.

When the crystallographic axis of a quarter-wave plate is aligned with the direction of polarization of incident laser light, the direction of polarization of light passing through the quarter-wave plate will not be changed. In contrast, when the crystallographic axis of a quarter-wave plate has an angle of 45° with respect to the direction of polarization of incident laser light, the direction of polarization of light passing through the quarter-wave plate will be changed. When the light passing through the quarter-wave plate is reflected from a reflecting device and passed through the quarter-wave plate again, the direction of polarization will be changed by 90° from the direction of polarization of the light that has not passed through the quarter-wave plate at all. This results in linearly polarized light. Now, assume that the crystallographic axis of the first quarter-wave plate 10-4a has an angle of 45° relative to the direction of polarization of incident laser light and the crystallographic axis of the second quarter-wave plate 10-4b has an angle of 0° relative to the direction of polarization of incident laser light. In this case, a component of light traveling from the first solid-state laser rod 4-1 to the polarizer 10-1 is transmitted by the polarizer 10-1. The linearly polarized light of the component passes through the first quarter-wave plate 10-4a twice because it reflects from the reflecting device 7-1. This causes the direction of polarization to change 90°. When the light falls on the polarizer 10-1 again, it is reflected. The light is thus propagated outside the transverse single-mode resonator. The transverse single-mode resonator is inactivated. No laser output is provided. A component of light traveling from the first solid-state laser rod 4-1 to the polarizer 10-1 is reflected from the polarizer 10-1. Although linearly polarized light of the component passes through the second quarter-wave plate 10-4b twice because it reflects from the reflecting device 7-2, the direction of polarization of the light is not changed. When the light falls on the polarizer 10-1 again, it is reflected therefrom. Transverse multi-mode light is then output. Likewise, assume that the crystallographic axis of the first quarter-wave plate has an angle of 0° relative to the direction of polarization of incident laser light and the crystallographic axis of the second quarter-wave plate has an angle of 45° relative to the direction of polarization of incident laser light. In this case, the transverse single-mode resonator is activated but the transverse multi-mode resonator is inactivated. Transverse single-mode light is therefore output. The rotating device control unit 25-7 is included for controlling an angle of rotation by which the first rotating device 10-5a and second rotating device 10-5b rotate the first quarter-wave plate 10-4a and second quarter-wave plate 10-4b respectively. Consequently, the transverse single-mode resonator and transverse multi-mode resonator can be activated selectively.

The stability criteria of a high average-power transverse single-mode resonator are confined to a narrow range in the stability domain. Therefore, if solid-state laser rods are excited with application of instantaneously high-power exciting light, the transverse single-mode resonator fails to satisfy the stability criteria. In contrast, a high average-power transverse multi-mode resonator has a small length and the stability criteria of the transverse multi-mode resonator are set to fall within a wide range in the stability domain. The transverse multi-mode resonator can therefore provide a laser output whose intensity is proportional to the power of exciting light. The rotating device control unit 25-7 is therefore included for setting an angle of rotation by which the quarter-wave plates are rotated in order to activate the transverse multi-mode resonator. Transverse multi-mode light alone is thus propagated. When transverse multi-mode light is output as result of transverse multi-mode laser oscillation, the heat lens effects exerted by the solid-state laser rods are suppressed. Assume that the heat lens effects having been suppressed to a certain level can be compensated by the heat lens compensating device 6 included in the transverse single-mode resonator. The rotating device control unit 25-7 then gives control to rotate the first quarter-wave plate and second quarter-wave plate so that they will have angles of 0° and 45° respectively relative to the direction of polarization of incident laser light. Consequently, the transverse single-mode resonator is activated instantaneously, and high-power transverse single-mode light is output instantaneously.

As mentioned above, according to the sixth embodiment, the first optical path switching control device 10B consists of the polarizer 10-1, first quarter-wave plate 10-4a, second quarter-wave plate 10-4b, first rotating device 10-5a, second rotating device 10-5b, optical path switching control device 25B, first current line 46-1, and second current line 26-2. The optical path switching control device 25B includes the rotating device control unit 25-7. High average-power transverse single-mode light is output instantaneously. Moreover, transverse multi-mode light and transverse single-mode light can be output selectively.

A high average-power transverse single-mode resonator may, like those of the first to sixth embodiments, consist of two solid-state laser rods, two solid-state laser rod modules, a 90° optical rotator, two heat lens compensating device, a reflection device, and a partial reflection device. The solid-state laser rods are placed coaxially in parallel with each other. The solid-state laser rod modules each have an exciting source and excite the solid-state laser rods. The 90° optical rotator is located at a middle point between the two solid-state laser rods and placed coaxially with the solid-state laser rods. The heat lens compensating device are placed coaxially with the solid-state laser rods and arranged outside the solid-state laser rods while separated from the solid-state laser rods by an equal distance. The reflecting device and partial reflection device are placed coaxially with the solid-state laser rods and arranged outside the heat lens compensating device while separated from the heat lens compensating device by an equal distance. Alternatively, the high average-power transverse single-mode resonator may consist of any number of solid-state laser rods, any number of solid-state laser rod modules, any number of 90° optical rotators, any number of heat lens compensating device, a reflecting device, and a partial deflection device. The solid-state laser rods are arranged coaxially in parallel with each other. The solid-state laser rod modules each have an exciting source and excite the solid-state laser rods. The 90° optical rotators are placed coaxially with the solid-state laser rods and arranged between any number of the solid-state laser rods. The heat lens compensating device are placed coaxially with the solid-state laser rods and located at any positions. The reflecting device and partial reflection device are placed coaxially with the solid-state laser rods and arranged outside all the solid-state laser rods and heat lens compensating device. Moreover, the reflecting surfaces of the reflecting device and partial reflection device may be flat surfaces, convex surfaces, or concave surfaces. Compared with the case where the solid-state laser rods, heat lens compensating device, and reflecting device and partial reflection device are arranged mutually symmetrically with a 90° optical rotator as a center, the stability criteria of the resonator are instantaneously confined to a narrow range in the stability domain. However, when a driving current to be raised at intervals of time τ is made smaller, the range in the stability domain may be shifted to another range within which the stability domain falls responsively to application of high-power exciting light. As a whole, the stability criteria of the resonator may be set to fall within a wide range.

Moreover, the high average-power transverse single-mode resonators described in relation to the fourth to sixth embodiments each have the solid-state laser rods, heat lens compensating device, first optical path switching device and second optical path switching device, and reflecting device and partial reflection device arranged mutually symmetrically with the 90° optical rotator as a center. Alternatively, the high average-power transverse single-mode resonators may each consist of any number of solid-state laser rods, any number of solid-state laser rod modules, any number of 90° optical rotators, any number of heat lens compensating device, any number of optical path switching device, a reflecting device and a partial reflection device. The solid-state laser rods are arranged coaxially in parallel with each other. The solid-state laser rod modules each have an exciting source and excite the solid-state laser rods. The 90° optical rotators are placed coaxially with the solid-state laser rods and arranged between the any number of solid-state laser rods. The heat lens compensating device are placed coaxially with the solid-state laser rods and located at any positions. The optical path switching device are placed coaxially with the solid-state laser rods and located at any positions. The reflecting device and partial reflection device are placed coaxially with the solid-state laser rods and arranged outside all the solid-state laser rods, optical path switching device, and heat lens compensating device. The reflecting surfaces of the reflecting device and partial reflection device may be flat surfaces, convex surfaces, or concave surfaces.

The advantage of a solid-state laser oscillator in accordance with the present invention will be described below.

As has been described, the solid-state laser oscillator in accordance with the present invention have the advantage that high average-power laser light can be supplied on a highly stable basis with the stability criteria of a resonator set to fall within a wide range in the stability domain.

Another advantage of a solid-state laser oscillator in accordance with the present invention is that a driving current can be raised stepwise or continuously at a certain rate.

Another advantage of a solid-state laser oscillator in accordance with the present invention is that laser oscillation can be achieved properly merely by entering appropriate parameter values but the stability criteria of a resonator will not be deviated from the stability domain. Moreover, the parameters can be set to any values according to various conditions or purposes of use. This is quite helpful.

Another advantage of a solid-state laser oscillator in accordance with the present invention is that a driving current to be fed to exciting sources is controlled to increase or decrease through feedback of a value detected from sample light. Laser oscillation can therefore be achieved with the stability criteria of a resonator not deviated from the stability domain. Moreover, even when a range in the stability domain within which the stability criteria fall is shifted because of a change in heat lens effects, the stability criteria will not be deviated from the stability domain. Besides, high average-power laser light can be supplied on a highly stable basis.

Another advantage of a solid-state laser oscillator in accordance with the present invention is that a driving current to be fed to exciting sources is controlled to increase or decrease through feedback of a value detected from leakage light. Laser oscillation can be achieved with the stability criteria of a resonator not deviated from the stability domain. Moreover, even when a range in the stability domain within which the stability criteria fall is shifted because of a change in heat lens effects, the stability criteria will not be deviated from the stability domain. Besides, high average-power laser light can be supplied on a highly stable basis. Furthermore, since leakage light is merely received, the configuration of the solid-state laser oscillator can be simplified.

Another advantage of a solid-state laser oscillator in accordance with the present invention is that laser outputs may be switched and high average-power laser light can be supplied on a highly stable basis. Transverse multi-mode laser oscillation is achieved first with the stability criteria of a resonator set to fall within a wide range in the stability domain. Heat lens effects are thus suppressed. After the heat lens effects are suppressed down to a stable level, transverse multi-mode laser oscillation is switched to transverse single-mode laser oscillation. Thus, high average-power transverse single-mode light can be supplied instantaneously.

Another advantage of a solid-state laser oscillator in accordance with the present invention is that the employment of Pockels cells permits simplification of the configuration of the solid-state laser oscillator. When a voltage is applied to an electrooptic crystal of the Pockels cell, the direction of polarization of light passing through the crystal is changed. Moreover, the direction of polarization of light can be changed according to whether or not the voltage is applied.

Another advantage of a solid-state laser oscillator in accordance with the present invention is that transverse multi-mode light and transverse single-mode light can be switched merely by selecting either of Pockels cells to which a voltage is applied.

Another advantage of a solid-state laser oscillator in accordance with the present invention is that the configuration of the solid-state laser oscillator can be simplified. Moreover, transverse multi-mode light and transverse single-mode light can be switched readily merely by selecting either of Pockels cells to which a voltage is applied.

Another advantage of a solid-state laser oscillator in accordance with the present invention is that the employment of acoustooptic devices permits simplification of the configuration of the solid-state laser oscillator. Moreover, light can be diffracted readily according to whether or not the acoustooptic devices are driven.

Another advantage of a solid-state laser oscillator in accordance with the present invention is that transverse multi-mode light and transverse single-mode light can be switched readily merely by driving either of acoustooptic devices.

Another advantage of a solid-state laser oscillator in accordance with the present invention is that the configuration of the solid-state laser oscillator can be simplified. Moreover, transverse multi-mode light and transverse single-mode light can be switched readily merely by selecting either of acoustooptic devices to be driven.

Another advantage of a solid-state laser oscillator in accordance with the present invention is that the employment of quarter-wave plates permits simplification of the configuration of the solid-state laser oscillator. Moreover, the direction of polarization of light can be changed proportionally to an angle of rotation by which a quarter-wave plate is turned.

Another advantage of a solid-state laser oscillator in accordance with the present invention is that the configuration of the solid-state laser oscillator can be simplified.

What is claimed is:

1. A solid-state laser oscillator comprising:
    at least two solid-state laser rods disposed coaxially in series with each other, radiating light when excited, and amplifying the light through stimulated emission, wherein a heat lens is generated when excited;
    at least one solid-state laser rod exciting device, exciting said solid-state laser rods;
    at least one 90° optical rotator disposed coaxially with said solid-state laser rods, arranged between any number of said solid-state laser rods, and rotating a component of the light generated in the axial direction;
    at least one heat lens compensating device disposed coaxially with said solid-state laser rods and located at any position;
    at least one reflecting device and at least one partial reflection device, disposed coaxially with said solid-state laser rods, for generating a laser light by propagating the axially generated component of the light where said at least one heat lens compensating device, at least one optical rotator, solid-state rods, and at least one exciting device lie coaxially between said reflecting device and said partial reflection device; and
    an exciting source driving device, driving exciting sources included in said solid-state laser rod exciting device by a driving current, wherein the driving current are controlled on the basis of increase and decrease of said heat lens due to a change of said laser light.

2. A solid-state laser oscillator as claimed in claim 1, wherein said heat lens, which decreases more when said laser light oscillates, are generated when excited in said solid-state laser rods, and said exciting source driving device includes:
    an exciting source driving power supply for feeding a driving current used to drive said exciting sources; and a supply current control unit for controlling said exciting source driving power supply according to a predetermined time constant so as to increase said driving current.

3. A solid-state laser oscillator as claimed in claim 2, wherein said supply current control unit applies a driving current to be an oscillation threshold value so that said driving current is increased at time intervals of said time constant after a time corresponding to said time constant elapses.

4. A solid-state laser oscillator as claimed in claim 1, further comprising:
    a first optical path switching device placed coaxially with said solid-state laser rods, interposed between a first solid-state laser rod and a first heat lens compensating device, and transmitting and reflecting an axially generated component of the light radiated from said first solid-state laser rod and a second solid-state laser rod;
    a second optical path switching device placed coaxially with said first and second solid-state laser rods, interposed between said second solid-state laser rod and a second heat lens compensating device, and transmitting and reflecting the axially generated component of the light radiated from said first and second solid-state laser rods;
    a second reflecting device placed coaxially with and perpendicularly to a light component reflected from said first optical path switching device;
    a second partial reflection device placed coaxially with, and perpendicularly to, the light component reflected from said second optical path switch device; and
    a switching control device, connected to said first optical path switching device, for controlling switching of optical paths wherein a component of light, prpagating between said first or second reflecting devices and said first or second partial reflection devices, is transmitted by said first or second partial reflection devices and output as transverse single-mode output light; and
    a component of light propagated between said second reflecting device and second partial reflection device, is transmitted by said second partial reflection device and output as transverse multi-mode output light, where
        the laser outputs that are the transverse single-mode output light and transverse multi-mode output light are switched using said optical path switching control device.

5. A solid-state laser oscillator as claimed in claim 4, wherein said first optical path switching device includes:
    a first polarizer placed coaxially with said first and second solid-state laser rods;
    a first Pockels cell placed coaxially with said first and second solid-state laser rods and disposed between said first polarizer and one of said heat lens compensating devices; and
    a second Pockels cell placed on the ray axis of a light component reflected from said first polarizer and disposed between said first polarizer and second reflecting device, and wherein said second optical path switching device includes:
    a second polarizer placed coaxially with said first and second solid-state laser rods; and
    a half-wave plate placed coaxially with said first and second solid-state laser rods, and disposed between said second solid-state laser rod and second polarizer.

6. A solid-state laser oscillator as claimed in claim 5, wherein said optical path switching control device includes a first high-voltage power supply for applying a voltage to said first Pockels cell, a second high-voltage power supply for applying a voltage to said second Pockels cell, and a high-voltage power supply control unit for controlling the driving conditions for said first high-voltage power supply and second high-voltage power supply.

7. A solid-state laser oscillator as claimed in claim 5, wherein said optical path switching control device includes a high-voltage power supply for applying a voltage to either of said first Pockels cell and second Pockels cell, and a high-voltage output switching unit for switching destinations of an output of said high-voltage power supply.

8. A solid-state laser oscillator as claimed in claim 4, wherein said first optical path switching device includes a first polarizer placed coaxially with said first and second solid-state laser rods, a first acoustooptic device placed coaxially with said first and second solid-state laser rods and disposed between said first polarizer and one of said heat lens compensating devices, and a second acoustooptic device placed on the ray axis of a light component reflected from said first polarizer and disposed between said first polarizer and second reflecting device, and wherein said second optical path switching device includes a second polarizer placed coaxially with said first and second solid-state laser rods, and a half-wave plate placed coaxially with said first and second solid-state laser rods and disposed between said second solid-state laser rod and second polarizer.

9. A solid-state laser oscillator as claimed in claim 8, wherein said optical path switching control device includes a first acoustooptic device driving power supply for driving said first acoustooptic device, a second acoustooptic device driving power supply for driving said second acoustooptic device, and an acoustooptic device driving power supply control unit for controlling the driving conditions for said first and second acoustooptic device driving power supplies.

10. A solid-state laser oscillator as claimed in claim 8, wherein said optical path switching control device includes an acoustooptic device driving power supply for driving either of said first and second acoustooptic devices, and a driving current switching unit for switching destinations of a driving current output from said acoustooptic device driving power supply.

11. A solid-state laser oscillator as claimed in claim 4, wherein said first optical path switching device includes a first polarizer placed coaxially with said first and second solid-state laser rods, a first quarter-wave plate placed coaxially with said first and second solid-state laser rods and disposed between said first polarizer and one of said heat lens compensating device, a second quarter-wave plate placed on the ray axis of a light component reflected from said first polarizer and disposed between said first polarizer and second reflecting devices, a first rotating unit for rotating said first quarter-wave plate, and a second rotating unit for rotating said second quarter-wave plate, and wherein said second optical path switching device includes a second polarizer placed coaxially with said first and second solid-state laser rods, and a half-wave plate placed coaxially with said first and second solid-state laser rods and disposed between said second solid-state laser rod and second polarizer.

12. A solid-state laser oscillator as claimed in claim 11, wherein said optical path switching device includes a rotation control unit for controlling the rotations of said first and second rotating units.

13. A solid-state laser oscillator as claimed in claim 2, wherein said supply current control unit applies a driving current to be an oscillation threshold value so that said driving current is constantly increased, at a rate determined by a resonance domain and said time constant, and decreased, after an elapsed time corresponding to said time constant.

14. A solid-state laser oscillator as claimed in claim 1, wherein said exciting source driving device further includes: a exciting source driving power supply for feeding a driving current used to drive said exciting sources; a light receiving unit for receiving a portion of said laser light, converting the portion of said laser light into an electric signal, and outputting the electric signal; and a supply current control unit for controlling said exciting source driving power supply according to the electric signal output from said light receiving unit, wherein said supply current control unit respectively differentiates said electric signal outputted from said light receiving unit and said driving current generated by said exciting source driving power supply, and controls said exciting source driving power supply on the basis of the differential result.

15. A solid-state laser oscillator as claimed in claim 14, wherein said exciting source driving device further includes a beam splitter, disposed on the ray axis of said laser light, for reflecting part of said laser light and outputting it as a sample light, wherein said light receiving unit receives the sample light from said beam splitter, converts it into an electric signal, and outputs the electric signal.

16. A solid-state laser oscillator as claimed in claim 15, wherein said supply current control unit operates according to the following differential result:

increases said driving current when a differential signal of said driving current is positive (+) and a differential signal of said sample light is positive (+);

decreases said driving current when a differential signal of said driving current is positive (+) and a differential signal of said sample light is negative (−);

decreases said driving current when a differential signal of said driving current is negative (−) and a differential signal of said sample light is positive (+); and increases said driving current when a differential signal of said driving current is negative (−) and a differential signal of said sample light is negative (−).

17. A solid-state laser oscillator as claimed in claim 14, wherein a light receiving unit receives, as a part of said laser light, a leakage light which leaks out of said reflecting device in proportion to said laser light, converts the leakage light into an electric signal, and outputs the electric signal.

18. A solid-state laser oscillator as claimed in claim 17, wherein said supply current control unit operates according to the following differential result:

increases said driving current when a differential signal of said driving current is positive (+) and a differential signal of said sample light is positive (+);

decreases said driving current when a differential signal of said driving current is positive (+) and a differential signal of said sample light is negative (−);

decreases said driving current when a differential signal of said driving current is negative (−) and a differential signal of said sample light is positive (+); and increases said driving current when a differential signal of said driving current is negative (−) and a differential signal of said sample light is negative (−).

* * * * *